(12) United States Patent
Zhou et al.

(10) Patent No.: US 11,595,105 B1
(45) Date of Patent: Feb. 28, 2023

(54) BEAM FAILURE RECOVERY FOR A PRIMARY CELL

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/452,311

(22) Filed: Oct. 26, 2021

(51) Int. Cl.
*H04B 7/06* (2006.01)
*H04W 74/00* (2009.01)
*H04W 74/08* (2009.01)
*H04W 76/19* (2018.01)

(52) U.S. Cl.
CPC ........ *H04B 7/0695* (2013.01); *H04W 74/004* (2013.01); *H04W 74/0841* (2013.01); *H04W 76/19* (2018.02)

(58) Field of Classification Search
CPC .............. H04B 7/0695; H04W 74/004; H04W 74/0841; H04W 76/19
See application file for complete search history.

(56) References Cited

U.S. PATENT DOCUMENTS

| | | | |
|---|---|---|---|
| 2014/0092865 A1* | 4/2014 | Heo | H04B 5/00 370/331 |
| 2017/0207845 A1* | 7/2017 | Moon | H04B 7/088 |
| 2018/0070352 A1* | 3/2018 | Takeda | H04W 72/0446 |
| 2021/0036757 A1* | 2/2021 | Yu | H04L 1/1861 |
| 2021/0184749 A1* | 6/2021 | Chen | H04W 72/0473 |
| 2021/0352500 A1* | 11/2021 | Yang | H04L 41/0668 |
| 2022/0052748 A1* | 2/2022 | Yang | H04L 1/0026 |
| 2022/0060302 A1* | 2/2022 | Zhang | H04W 72/08 |

FOREIGN PATENT DOCUMENTS

| | | |
|---|---|---|
| EP | 3860184 A1 | 8/2021 |
| WO | 2021037043 A1 | 3/2021 |

OTHER PUBLICATIONS

International Search Report and Written Opinion—PCT/US2022/075336—ISA/EPO—dated Nov. 25, 2022.

\* cited by examiner

*Primary Examiner* — Harry H Kim
(74) *Attorney, Agent, or Firm* — Harrity & Harrity LLP/Qualcomm

(57) ABSTRACT

Various aspects of the present disclosure generally relate to wireless communication. In some aspects, an apparatus may transmit, to a base station, a request to transmit uplink control information (UCI), for a first physical uplink control channel (PUCCH) group that includes a primary cell (PCell) and for a second PUCCH group that includes a PUCCH secondary cell (SCell), via the PUCCH SCell. The apparatus may receive, from the base station, an indication of whether the request is rejected or approved. Numerous other aspects are described.

30 Claims, 15 Drawing Sheets

BEAM FAILURE RECOVERY FOR A PRIMARY CELL

FIELD OF THE DISCLOSURE

Aspects of the present disclosure generally relate to wireless communication and to techniques and apparatuses for beam failure recovery for a primary cell.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include transmitting, to a base station, a request to transmit uplink control information (UCI), for a first physical uplink control channel (PUCCH) group that includes a primary cell (PCell) and for a second PUCCH group that includes a PUCCH secondary cell (SCell), via the PUCCH SCell. The method may include receiving, from the base station, an indication of whether the request is rejected or approved.

Some aspects described herein relate to a method of wireless communication performed by an apparatus of a base station. The method may include receiving, from a UE, a request to transmit UCI, for a first PUCCH group that includes a PCell and for a second PUCCH group that includes a PUCCH SCell, via the PUCCH SCell. The method may include transmitting, to the UE, an indication of whether the request is rejected or approved.

Some aspects described herein relate to a method of wireless communication performed by an apparatus of a UE. The method may include receiving, from a base station, an indication to transmit UCI, for a first PUCCH group that includes a PCell and for a second PUCCH group that includes a PUCCH SCell, via the PUCCH SCell. The method may include transmitting, to the base station, the UCI via the PUCCH SCell based at least in part on the indication.

Some aspects described herein relate to a method of wireless communication performed by an apparatus of a base station. The method may include transmitting, to a UE, an indication to transmit UCI, for a first PUCCH group that includes a PCell and for a second PUCCH group that includes a PUCCH SCell, via the PUCCH SCell. The method may include receiving, from the UE, the UCI via the PUCCH SCell based at least in part on the indication.

Some aspects described herein relate to an apparatus for wireless communication at a UE. The apparatus may include a memory and one or more processors coupled to the memory. The one or more processors may be configured to transmit, to a base station, a request to transmit UCI, for a first PUCCH group that includes a PCell and for a second PUCCH group that includes a PUCCH SCell, via the PUCCH SCell. The one or more processors may be configured to receive, from the base station, an indication of whether the request is rejected or approved.

Some aspects described herein relate to an apparatus for wireless communication at a base station. The apparatus may include a memory and one or more processors coupled to the memory. The one or more processors may be configured to receive, from a UE, a request to transmit UCI, for a first PUCCH group that includes a PCell and for a second PUCCH group that includes a PUCCH SCell, via the PUCCH SCell. The one or more processors may be configured to transmit, to the UE, an indication of whether the request is rejected or approved.

Some aspects described herein relate to an apparatus for wireless communication at a UE. The apparatus may include a memory and one or more processors coupled to the memory. The one or more processors may be configured to receive, from a base station, an indication to transmit UCI, for a first PUCCH group that includes a PCell and for a second PUCCH group that includes a PUCCH SCell, via the PUCCH SCell. The one or more processors may be configured to transmit, to the base station, the UCI via the PUCCH SCell based at least in part on the indication.

Some aspects described herein relate to an apparatus for wireless communication at a base station. The apparatus may include a memory and one or more processors coupled to the memory. The one or more processors may be configured to transmit, to a UE, an indication to transmit UCI, for a first PUCCH group that includes a PCell and for a second PUCCH group that includes a PUCCH SCell, via the PUCCH SCell. The one or more processors may be configured to receive, from the UE, the UCI via the PUCCH SCell based at least in part on the indication.

Some aspects described herein relate to a non-transitory computer-readable medium that stores a set of instructions for wireless communication by a UE. The set of instructions, when executed by one or more processors of the UE, may cause the UE to transmit, to a base station, a request to transmit UCI, for a first PUCCH group that includes a PCell and for a second PUCCH group that includes a PUCCH SCell, via the PUCCH SCell. The set of instructions, when executed by one or more processors of the UE, may cause the UE to receive, from the base station, an indication of whether the request is rejected or approved.

Some aspects described herein relate to a non-transitory computer-readable medium that stores a set of instructions for wireless communication by a base station. The set of instructions, when executed by one or more processors of the base station, may cause the base station to receive, from a UE, a request to transmit UCI, for a first PUCCH group that includes a PCell and for a second PUCCH group that includes a PUCCH SCell, via the PUCCH SCell. The set of instructions, when executed by one or more processors of the base station, may cause the base station to transmit, to the UE, an indication of whether the request is rejected or approved.

Some aspects described herein relate to a non-transitory computer-readable medium that stores a set of instructions for wireless communication by a UE. The set of instructions, when executed by one or more processors of the UE, may cause the UE to receive, from a base station, an indication to transmit UCI, for a first PUCCH group that includes a PCell and for a second PUCCH group that includes a PUCCH SCell, via the PUCCH SCell. The set of instructions, when executed by one or more processors of UE, may cause the UE to transmit, to the base station, the UCI via the PUCCH SCell based at least in part on the indication.

Some aspects described herein relate to a non-transitory computer-readable medium that stores a set of instructions for wireless communication by a base station. The set of instructions, when executed by one or more processors of the base station, may cause the base station to transmit, to a UE, an indication to transmit UCI, for a first PUCCH group that includes a PCell and for a second PUCCH group that includes a PUCCH SCell, via the PUCCH SCell. The set of instructions, when executed by one or more processors of the base station, may cause the base station to receive, from the UE, the UCI via the PUCCH SCell based at least in part on the indication.

Some aspects described herein relate to an apparatus for wireless communication. The apparatus may include means for transmitting, to a base station, a request to transmit UCI, for a first PUCCH group that includes a PCell and for a second PUCCH group that includes a PUCCH SCell, via the PUCCH SCell. The apparatus may include means for receiving, from the base station, an indication of whether the request is rejected or approved.

Some aspects described herein relate to an apparatus for wireless communication. The apparatus may include means for receiving, from a UE, a request to transmit UCI, for a first PUCCH group that includes a PCell and for a second PUCCH group that includes a PUCCH SCell, via the PUCCH SCell. The apparatus may include means for transmitting, to the UE, an indication of whether the request is rejected or approved.

Some aspects described herein relate to an apparatus for wireless communication. The apparatus may include means for receiving, from a base station, an indication to transmit UCI, for a first PUCCH group that includes a PCell and for a second PUCCH group that includes a PUCCH SCell, via the PUCCH SCell. The apparatus may include means for transmitting, to the base station, the UCI via the PUCCH SCell based at least in part on the indication.

Some aspects described herein relate to an apparatus for wireless communication. The apparatus may include means for transmitting, to a UE, an indication to transmit UCI, for a first PUCCH group that includes a PCell and for a second PUCCH group that includes a PUCCH SCell, via the PUCCH SCell. The apparatus may include means for receiving, from the UE, the UCI via the PUCCH SCell based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
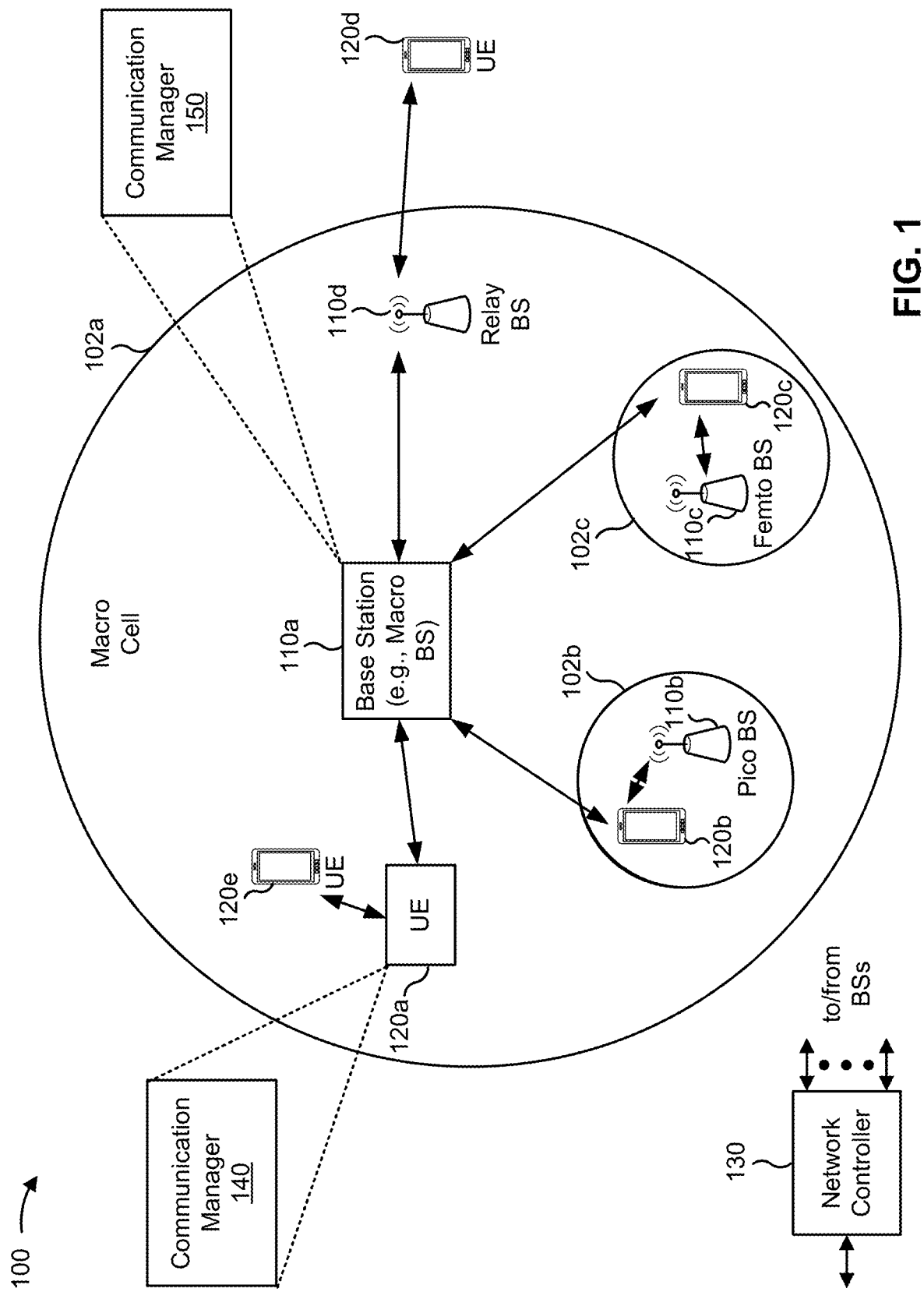
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a base station, a request to transmit uplink control information (UCI), for a first physical uplink control channel (PUCCH) group that includes a primary cell (PCell) and for a second PUCCH group that includes a PUCCH secondary cell (SCell), via the PUCCH SCell; and receive, from the base station, an indication of whether the request is rejected or approved. As described in more detail elsewhere herein, the communication manager 140 may receive, from a base station, an indication to transmit UCI, for a first PUCCH group that includes a PCell and for a second PUCCH group that includes a PUCCH SCell, via the PUCCH SCell (e.g., an indication that the request is approved); and transmit, to the base station, the UCI via the PUCCH SCell based at least in part on the indication. Additionally, or alternatively, the communication manager 140 may perform one or more other operations described herein.

In some aspects, the base station 110 may include a communication manager 150. As described in more detail elsewhere herein, the communication manager 150 may receive, from a UE, a request to transmit UCI, for a first PUCCH group that includes a PCell and for a second PUCCH group that includes a PUCCH SCell, via the PUCCH SCell; and transmit, to the UE, an indication of whether the request is rejected or approved. As described in more detail elsewhere herein, the communication manager 150 may transmit, to a UE, an indication to transmit UCI, for a first PUCCH group that includes a PCell and for a second PUCCH group that includes a PUCCH SCell, via the PUCCH SCell; and receive, from the UE, the UCI via the PUCCH SCell based at least in part on the indication.

Additionally, or alternatively, the communication manager 150 may perform one or more other operations described herein.

As indicated above, FIG. 1 is provided as an example. Other examples may differ from what is described with regard to FIG. 1.

Figure 2:
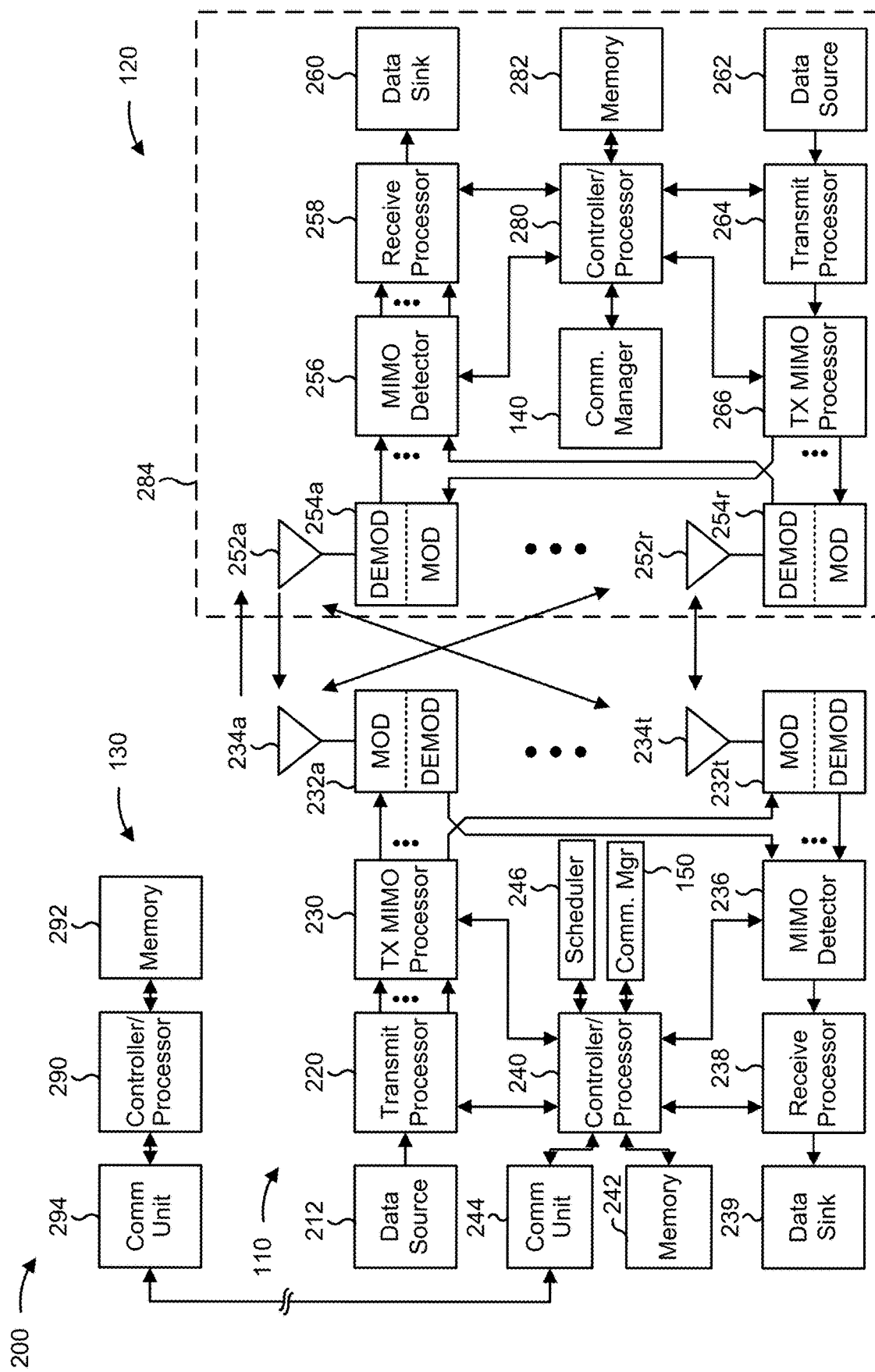
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with beam failure recovery for a primary cell, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for transmitting, to a base station, a request to transmit UCI, for a first PUCCH group that includes a PCell and for a second PUCCH group that includes a PUCCH SCell, via the PUCCH SCell; and/or means for receiving, from the base station, an indication of whether the request is rejected or approved. In some aspects, the UE 120 includes means for receiving, from a base station, an indication to transmit UCI, for a first PUCCH group that includes a PCell and for a second PUCCH group that includes a PUCCH SCell, via the PUCCH SCell (e.g., an indication that the request is approved); and/or means for transmitting, to the base station, the UCI via the PUCCH SCell based at least in part on the indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE, a request to transmit UCI, for a first PUCCH group that includes a PCell and for a second PUCCH group that includes a PUCCH SCell, via the PUCCH SCell; and/or means for transmitting, to the UE, an indication of whether the request is rejected or approved. In some aspects, the base station includes means for transmitting, to a UE, an indication to transmit UCI, for a first PUCCH group that includes a PCell and for a second PUCCH group that includes a PUCCH SCell, via the PUCCH SCell (e.g., an indication that the request is approved); and/or means for receiving, from the UE, the UCI via the PUCCH SCell based at least in part on the indication. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
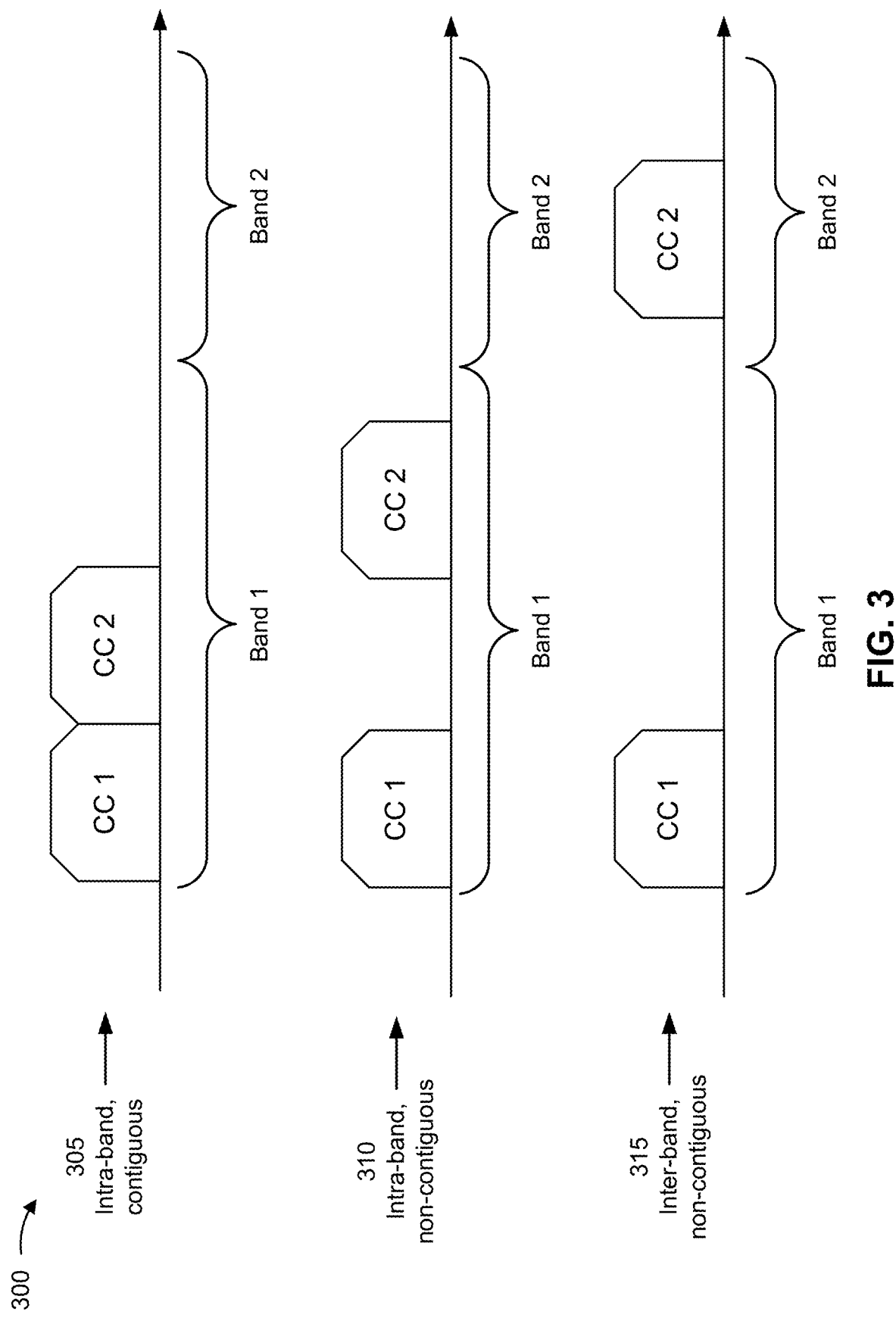
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier or PCell and one or more secondary carriers or SCells. In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 3 is provided as an example. Other examples may differ from what is described with regard to FIG. 3.

Figure 4:
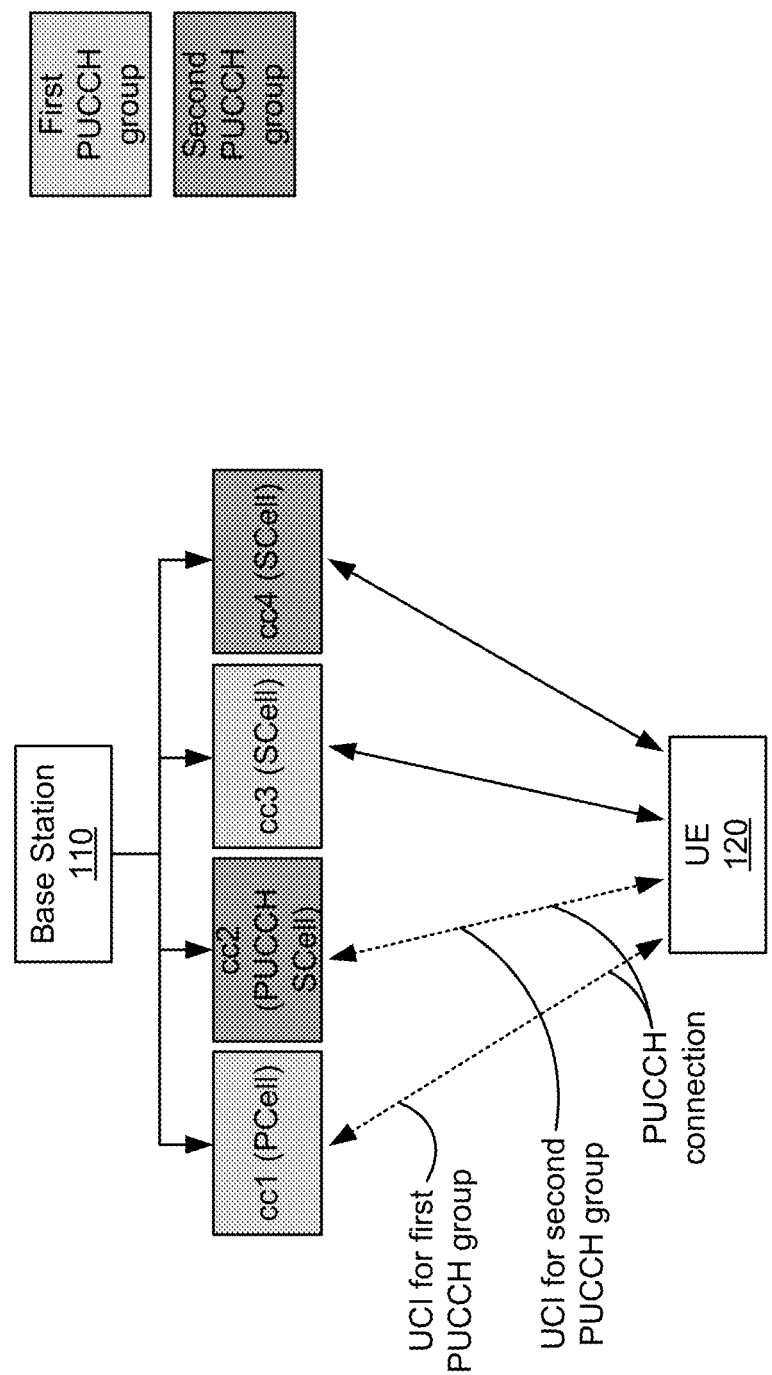
FIG. 4 is a diagram illustrating an example of communication using physical uplink control channel (PUCCH) groups, in accordance with the present disclosure.

FIG. 4 is a diagram illustrating an example 400 of communication using PUCCH groups, in accordance with the present disclosure.

As described above, a UE 120 operating under carrier aggregation may be connected to multiple serving cells, which may include a PCell and multiple SCells. In some examples, a base station 110 may configure, for the UE 120, a PUCCH on the PCell for transmission of UCI, such as channel state information, a scheduling request, hybrid automatic repeat request (HARD) feedback (e.g., an acknowledgment (ACK) or negative ACK (NACK)), or the like. Moreover, the UE 120 and the base station 110 may communicate data using a physical downlink shared channel (PDSCH) and/or a physical uplink shared channel (PUSCH) on the PCell and one or more SCells. In some examples, the base station 110 may configure multiple (e.g., two) PUCCH groups for the UE 120. A PUCCH group may refer to a group of carriers that includes a primary carrier and one or more secondary carriers. The primary carrier may be used for all PUCCH communications for the PUCCH group. In connection with configuring multiple PUCCH groups, the base station 110 may configure a special SCell, referred to as a "PUCCH SCell," for the UE 120. The PUCCH SCell may have a PUCCH connection to the base station 110 (e.g., in addition to the PUCCH connection of the PCell). Accordingly, UCI transmissions for one or more cells (e.g., in a first PUCCH group) may be conveyed via the PUCCH on the PCell, and UCI transmissions for one or more other cells (e.g., in a second PUCCH group) may be conveyed via the PUCCH on the PUCCH SCell.

As an example, as shown, the base station 110 may configure multiple (e.g., two) PUCCH groups for the UE 120 that include component carriers cc1-ccn. In particular, as shown, a first PUCCH group may include component carrier cc1 and component carrier cc3, and a second PUCCH group may include component carrier cc2 and component carrier ccn. In the example, component carrier cc1 may be a PCell and component carriers cc2, cc3, and ccn may be SCells. Moreover, component carrier cc2 may be configured as a PUCCH SCell. Accordingly, a first PUCCH connection between the UE 120 and the base station 110 may be on component carrier cc1 (e.g., the PCell), and a second PUCCH connection between the UE 120 and the base station 110 may be on component carrier cc2 (e.g., the PUCCH SCell). Thus, the PUCCH of the PCell may handle UCI transmissions for component carriers in the first PUCCH group (component carriers cc1 and cc3), and the PUCCH of the PUCCH SCell may handle UCI transmissions for component carriers in the second PUCCH group (component carriers cc2 and ccn).

A PUCCH group configuration for multiple PUCCH groups may indicate one or more cell indices for the cells (e.g., serving cells) that belong to each PUCCH group. In addition, the configuration may indicate a cell index for one or more cells that are PUCCH SCells. The base station 110 may select a PUCCH SCell (e.g., from among multiple SCells) based at least in part on one or more factors, such as a cell-level beam strength associated with a cell, a quantity of beams available in a cell, and/or a capability of the UE 120 for using multiple PUCCH groups. In addition, the base station 110 may subsequently switch a PUCCH SCell to a different SCell by transmitting a message (e.g., a medium access control (MAC) control element (CE) (MAC-CE) or DCI) that indicates a cell index for the different SCell. The PUCCH group configuration may also identify PUCCH group indices that are associated with the PCell and the PUCCH SCell(s), respectively. In some examples, the base station 110 may transmit multiple configurations for PUCCH groups (e.g., that identify multiple values for the aforementioned parameters). Here, the base station 110 may switch the configuration that the UE 120 is to use by transmitting a message (e.g., a MAC-CE or DCI) that indicates the configuration that the UE 120 is to use.

In some examples, the UE 120 (e.g., a MAC layer of the UE 120) may determine a beam failure for the PCell (e.g., when beam measurements fail to satisfy a threshold). Here, the UE 120 may initiate a random access procedure (which may also be referred to as a "random access channel (RACH) procedure"). In connection with the random access procedure, the UE 120 may first attempt contention-free random access and initiate a beam failure recovery (BFR) timer (e.g., beamFailureRecoveryTimer). The UE 120 may perform the contention-free random access using one or more preambles that are dedicated for contention-free random access and configured for the UE 120 by the base station 110 (e.g., the UE 120 may transmit a random access message preamble and a random access message payload as part of an initial step of a random access procedure). In some examples (e.g., if the UE 120 is not configured with dedicated preambles), the UE 120 may select a cell-specific preamble that is allocated for a BFR procedure. The UE 120 may then monitor a physical downlink control channel (PDCCH) for a random access response from the base station 110 using a cell radio network temporary identifier (C-RNTI). Reception of the random access response by the UE 120 indicates successful completion of BFR. Upon expiration of the BFR timer and if the contention-free random access was unsuccessful, the UE 120 may then attempt contention-based random access. Here, the UE 120 may monitor the PDCCH for the random access response from the base station 110 using a random access radio network temporary identifier (RA-RNTI). Reception of a content resolution message (e.g., a fourth message of the random access procedure) indicates successful completion of BFR.

However, the random access procedure may be time consuming, thereby expending excessive computing resources and power resources of the UE 120, as well as consuming excessive network resources. In addition, the random access procedure may not be adaptive to dynamic conditions in a wireless environment. Moreover, if the PCell fails due to beam failure, PUCCH communication may become unavailable, thereby preventing the UE 120 from transmitting UCI to the base station 110 and degrading a performance of communications between the UE 120 and the base station 110.

Some techniques and apparatuses described herein facilitate PCell BFR, UCI transmission, and/or communication between a UE 120 and a base station 110, under carrier aggregation, by utilizing an SCell. In some aspects, the UE 120 may transmit to the base station 110 a request to transmit UCI for a PUCCH group, that includes a PCell, via a PUCCH SCell, and the UE 120 may receive from the base station 110 an indication of whether the request is rejected or approved. In this way, signaling overhead is reduced relative to the signaling associated with a random access procedure, thereby conserving network resources. In some aspects, the UE 120 may receive from the base station 110 an indication to transmit UCI for the PUCCH group, that includes the PCell, via the PUCCH SCell, and the UE 120 may transmit the UCI for the PUCCH group to the base station 110 via the PUCCH SCell. In this way, the UE 120 may transmit the UCI for the PUCCH group with minimal or no interruption, thereby improving a performance of the UCI and a performance of communications between the UE 120 and the base station 110 in general. Moreover, the UE 120 may transmit a BFR message (e.g., a BFR MAC-CE) for the PCell via the PUCCH SCell or another SCell. In this way, the UE 120 may reduce BFR delay as well as conserve computing resources, power resources, and/or network resources relative to performing the random access procedure in response to the PCell beam failure.

As indicated above, FIG. 4 is provided as an example. Other examples may differ from what is described with respect to FIG. 4.

Figure 5:
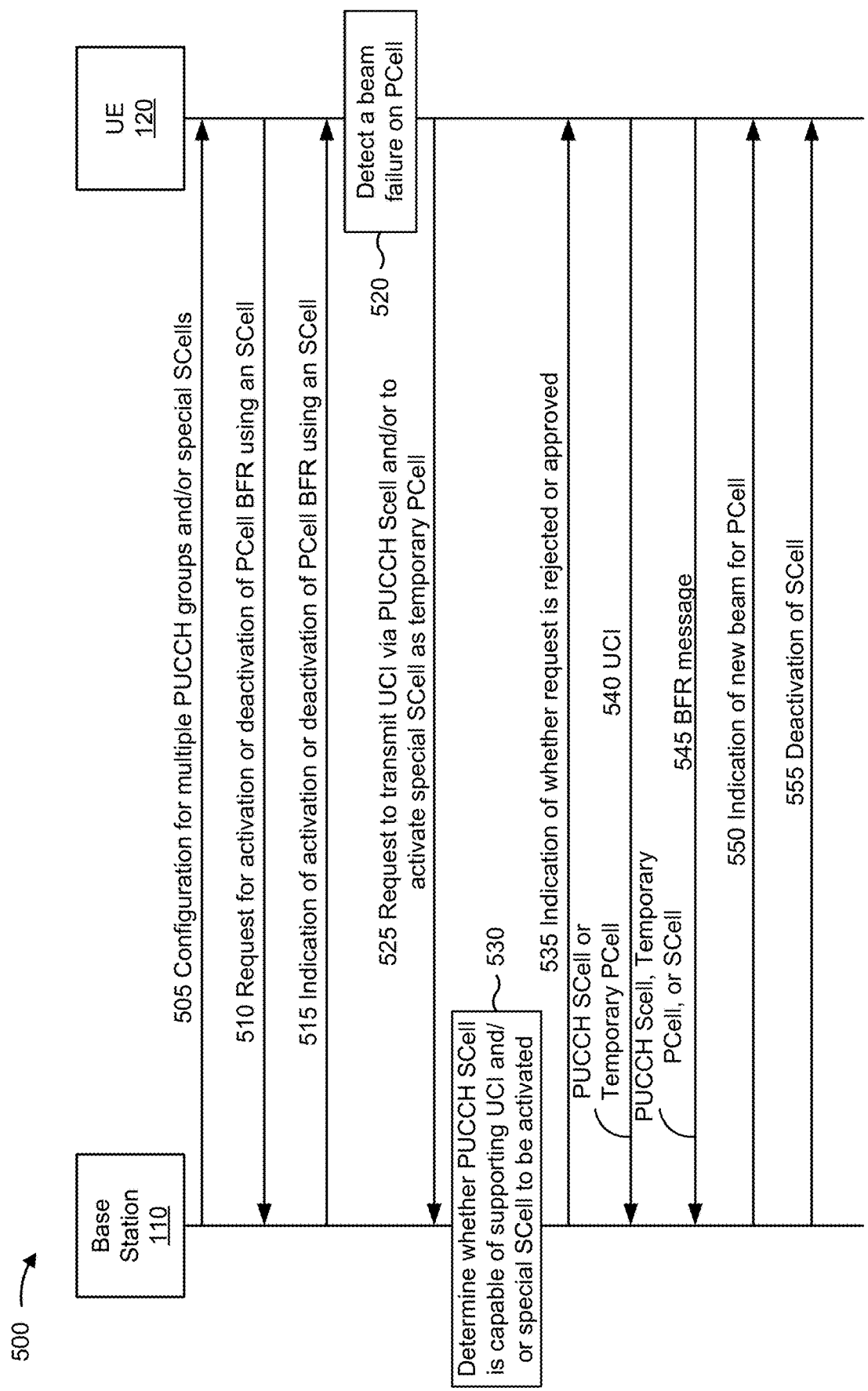
FIG. 5 is a diagram illustrating an example associated with communicating uplink control information via a PUCCH secondary cell or a temporary primary cell and beam failure recovery for a primary cell, in accordance with the present disclosure.

FIG. 5 is a diagram illustrating an example 500 associated with communicating UCI via a PUCCH SCell or a temporary PCell and beam failure recovery for a PCell, in accordance with the present disclosure. As shown in FIG. 5, a base station 110 and a UE 120 may communicate with one another. In some aspects, the UE 120 may use carrier aggregation (e.g., in accordance with a configuration transmitted by the base station 110) for communication with the base station 110. For example, the UE 120 may be configured with a PCell and one or more SCells for carrier aggregation.

As shown by reference number 505, the base station 110 may transmit, and the UE 120 may receive, a configuration (e.g., an RRC configuration) for multiple PUCCH groups (e.g., two PUCCH groups), in a similar manner as described herein. For example, the base station 110 may transmit a configuration for a first PUCCH group and a second PUCCH group. The configuration may further indicate a PCell of the first PUCCH group and a PUCCH SCell of the second PUCCH group, in a similar manner as described herein. Thus, a PUCCH on the PCell may be for UCI transmission for the first PUCCH group, and a PUCCH on the PUCCH SCell may be for UCI transmission for the second PUCCH group.

In some aspects, the base station 110 may transmit, and the UE 120 may receive, a configuration (e.g., an RRC configuration, that may be in the same RRC message as the configuration for the multiple PUCCH groups or in a different RRC message) that identifies (e.g., by cell index) one or more SCells that are to be candidate PCells if beam failure is detected on the PCell (the one or more SCells may be referred to herein as "special SCells"). That is, a special SCell may serve as a temporary PCell if beam failure is detected on the PCell. Thus, if the special SCell is activated as the temporary PCell, then a PUCCH connection may be established on the special SCell. The base station 110 may select a special SCell (e.g., from among multiple SCells) based at least in part on one or more factors, such as a cell-level beam strength associated with a cell, a quantity of beams available in a cell, and/or a capability of the UE 120 for using multiple PUCCH groups. In some aspects, the configuration may indicate a value of a timer (which may be referred to as "T_bfr"), as described below. Moreover, the base station 110 may indicate to the UE 120 a switch between multiple configurations of special SCells, timer values, or the like, using a message such as a MAC-CE or DCI.

As shown by reference number 510, the UE 120 may transmit, and the base station 110 may receive, a message requesting activation or deactivation of PCell BFR using an SCell (e.g., using the PUCCH SCell). In some aspects, the message requesting activation or deactivation of PCell BFR using an SCell may be a MAC-CE or UCI. As shown by reference number 515, the base station 110 may transmit, and the UE 120 may receive, a message that indicates activation or deactivation of PCell BFR using an SCell. In some aspects, the message indicating activation or deactivation of PCell BFR using an SCell may be a MAC-CE or DCI. The base station 110 may transmit the message indicating activation or deactivation of PCell BFR using an SCell in response to the request of the UE 120, or in the absence of the request from the UE 120.

In some aspects, the UE 120 may request activation or deactivation of PCell BFR using an SCell, and/or the base station 110 may indicate activation or deactivation of PCell BFR using an SCell, based at least in part on one or more factors. For example, the one or more factors may include a particular quality of service (QoS) requirement of traffic served to the UE 120, parameters of a connected mode discontinuous reception (C-DRX) configuration of the UE 120, a power or capacity constraint of the UE 120, and/or a capacity of the UE 120 for handling multiple PUCCH connections. For example, if any one or combination of these factors satisfies a threshold or is set to a particular parameter, the UE 120 may request and/or the base station 110 may indicate activation of PCell BFR using an SCell.

As shown by reference number 520, the UE 120 may detect (e.g., declare) a beam failure on the PCell. For example, the UE 120 may perform a Layer 1 (L1) measurement, such as an RSRP measurement, an RSRQ measurement, a signal to interference and noise ratio (SINR) measurement, or the like, of reference signals for a beam set associated with the PCell, and the UE 120 may determine that the L1 measurement (e.g., indicating a radio link quality) fails to satisfy a threshold. Based at least in part on determining that the L1 measurement fails to satisfy the threshold, the UE 120 may initiate a beam failure detection (BFD) timer and may increment a beam failure indication (BFI) count. If the BFI count satisfies a threshold before the expiration of the BFD timer, then the UE 120 may declare the beam failure.

As shown by reference number 525, the UE 120 may transmit (e.g., based at least in part on the beam failure on the PCell and/or PCell BFR being activated), and the base station 110 may receive, a request. In some aspects, the request may be to transmit UCI for the first PUCCH group and for the second PUCCH group (e.g., a request to transmit all UCI) via the PUCCH SCell. For example, the request may be to transmit UCI designated for transmission on the PCell (e.g., UCI associated with the PCell and one or more SCells of the first PUCCH group) via the PUCCH SCell. In some aspects, the request may indicate beam failure on the PCell. In some aspects, the request transmitted by the UE 120 may be to activate a special SCell as a temporary PCell. In some aspects, the UE 120 may select the special SCell (e.g., from among special SCells configured as candidate PCells for the UE 120). Here, the request may indicate the special SCell that is selected by the UE 120 (e.g., the request may function as an indication to the base station 110 that does not require a response from the base station 110). In some aspects, in connection with transmitting the request, the UE 120 may initiate a timer (T_bfr). If the UE 120 does not receive a response to the request from the base station by an expiration of the timer (e.g., because the base station 110 did not successfully receive the request), the UE 120 may initiate a random access procedure.

In some aspects, the UE 120 may transmit the request in a MAC-CE (i.e., Layer 2 (L2) signaling). In some aspects, the UE 120 may transmit the request in UCI (i.e., L1 signaling). For example, the UE 120 may transmit the UCI via the PCell (e.g., when the PCell is near failure, but the PUCCH on the PCell remains usable) or via the PUCCH SCell.

As shown by reference number 530, the base station 110 may determine (e.g., based at least in part on receiving the request, from the UE 120, to transmit UCI for the first PUCCH group and for the second PUCCH group via the PUCCH SCell) whether the PUCCH SCell is capable of supporting (e.g., handling) the UCI for the first PUCCH group and for the second PUCCH group (e.g., whether the PUCCH SCell is capable of supporting the UCI for all serving cells). That is, the base station 110 may determine whether the PUCCH SCell is capable of supporting the UCI for the first PUCCH group in addition to the UCI for the second PUCCH group that is already being supported by the PUCCH SCell. In some aspects, the base station 110 may determine whether the PUCCH SCell is capable of supporting the UCI for the first PUCCH group and for the second PUCCH group based at least in part on one or more factors. For example, the one or more factors may include a beam strength of the PUCCH SCell (e.g., whether the beam strength of the PUCCH SCell satisfies a threshold), a quantity of beams available in the PUCCH SCell (e.g., whether the quantity of beams satisfies a threshold), and/or a capability of the UE 120 for transmitting UCI for all serving cells on the PUCCH SCell. For example, if any one or combination of these factors satisfies a threshold or is set to a particular parameter, the base station 110 may determine that the PUCCH SCell is capable of supporting the UCI for the first PUCCH group and for the second PUCCH group.

In some aspects, the base station 110 may determine (e.g., based at least in part on receiving the request, from the UE 120, to activate a special SCell as a temporary PCell) the special SCell that is to be activated for the UE 120. For example, the base station 110 may determine the special SCell if the request does not indicate a special SCell selection of the UE 120. As another example, the base station 110 may determine whether a special SCell that is selected by the UE 120 is capable of supporting the UCI for the aggregated carriers, in a similar manner as described above.

As shown by reference number 535, the base station 110 may transmit, and the UE 120 may receive, an indication. In some aspects, the indication from the base station 110 may be in a MAC-CE or in DCI. In some aspects, the indication may indicate whether the request to transmit UCI for the first PUCCH group and for the second PUCCH group via the PUCCH SCell is rejected or approved. The request may be rejected or approved based at least in part on a determination by the base station 110 of whether the PUCCH SCell is capable of supporting the UCI for the first PUCCH group and for the second PUCCH group, as described herein. For example, the request may be rejected based at least in part on a determination by the base station 110 that the PUCCH SCell is not capable of supporting the UCI for the first PUCCH group and for the second PUCCH group. As another example, the request may be approved based at least in part on a determination by the base station 110 that the PUCCH SCell is capable of supporting the UCI for the first PUCCH group and for the second PUCCH group.

The indication indicating that the request to transmit UCI for the first PUCCH group and for the second PUCCH group via the PUCCH SCell is approved may be an indication to transmit UCI for the first PUCCH group and the second PUCCH group via the PUCCH SCell. In some aspects, the base station 110 may transmit the indication to transmit UCI for the first PUCCH group and the second PUCCH group via the PUCCH SCell in the absence of the request from the UE 120.

In some aspects, the indication may indicate an activation of a special SCell as the temporary PCell. For example, the indication may indicate that the special SCell selection of the UE 120 is activated as the temporary PCell. As another example, the indication may indicate the special SCell that is activated as the temporary PCell. Based at least in part on the activation of a special SCell as the temporary PCell, a PUCCH may be established on the temporary PCell (e.g., which may be used by the UE 120 to communicate UCI, such as ACK/NACK feedback, with the base station 110 during a BFR process).

As shown by reference number 540, the UE 120 may transmit (e.g., based at least in part on the indication from the base station 110), and the base station 110 may receive, UCI. In some aspects, the UE 120 may transmit the UCI for the first PUCCH group and for the second PUCCH group via the PUCCH SCell (e.g., the UE 120 may transmit the UCI for all serving cells via the PUCCH SCell). For example, the UE 120 may transmit the UCI for the first PUCCH group and for the second PUCCH group via the PUCCH SCell based at least in part on the indication from the base station 110 indicating that the UE 120 is to transmit UCI for the first PUCCH group and the second PUCCH group via the PUCCH SCell (e.g., the indication indicates that the request of the UE 120 is approved). In some aspects, the UE 120 may transmit the UCI for the aggregated carriers via the temporary PCell (e.g., the UE 120 may transmit the UCI for all serving cells via the temporary PCell). For example, the UE 120 may transmit the UCI for the aggregated carriers via the temporary PCell based at least in part on the indication from the base station 110 activating the special SCell as the temporary PCell. Thus, even though the PCell is associated with beam failure or is otherwise unavailable to be used to communicate UCI, the UE 120 may continue to transmit UCI for the first PUCCH group or for the aggregated carriers, without interruption or with minimal interruption, thereby improving a performance of the UCI.

As shown by reference number 545, the UE 120 may transmit (e.g., based at least in part on the indication from the base station 110), and the base station 110 may receive, a BFR message. The BFR message may be a MAC-CE (e.g., a BFR MAC-CE). The UE 120 may transmit the BFR message via the PUCCH SCell, the temporary PCell, or another SCell. In some aspects, the BFR message may indicate a reason for the beam failure on the PCell (e.g., the beam failure was due to interference or noise), failed beam information associated with the beam failure on the PCell (e.g., an index of the failed beam, a most-recent RSRP measurement for the failed beam, one or more past beam quality measurements for the failed beam over a particular time period, or the like), and/or preferred beam information associated with a beam preferred by the UE 120 (e.g., an index of the preferred beam, a beam quality measurement, or the like). In this way, the UE 120 may use an SCell to perform BFR for the PCell, thereby conserving processing resources, power resources, and/or network resources that would otherwise be expended in connection with a random access procedure for the PCell.

In some aspects, the UE 120 may transmit the BFR message based at least in part on receiving a message (as described in connection with reference number 515) that indicates activation of PCell BFR using an SCell. In some aspects, the UE 120 may transmit the BFR message based at least in part on the indication from the base station 110 indicating that the UE 120 is to transmit UCI for the first PUCCH group and the second PUCCH group via the PUCCH SCell or the indication indicating the activation of the special SCell as the temporary PCell (e.g., the indication indicates that the request of the UE 120 is approved). In some aspects, the UE 120 may transmit, and the base station 110 may receive, one or more messages of a random access procedure for the PCell (e.g., the UE 120 may initiate the random access procedure for the PCell BFR) based at least in part on the indication indicating that the request of the UE 120 is rejected. In other words, at reference number 535, if the base station 110 sends an indication indicating that the request to transmit UCI for the first PUCCH group and for the second PUCCH group via the PUCCH SCell is rejected or PCell BFR using an SCell is deactivated at reference number 510 and/or reference number 515, then the UE 120 may revert to performing a random access procedure for the PCell BFR rather than attempting PCell BFR using an SCell.

As shown by reference number 550, the base station 110 may transmit (e.g., based at least in part on receiving the BFR message), and the UE 120 may receive, a message that indicates a new beam for the PCell. The message indicating the new beam may be a MAC-CE (e.g., a downlink MAC-CE) or DCI. The message indicating the new beam may indicate to the UE 120 that the PCell BFR (e.g., via the PUCCH SCell, the temporary PCell, or another SCell) was successful. For example, the message indicating the new beam may indicate that the PUCCH groups are to return to an original configuration. Thus, the UE 120 may return to transmitting UCI for the first PUCCH group via the PCell and to transmitting UCI for the second PUCCH group via the PUCCH SCell. As another example, the message indicating the new beam may indicate that the PUCCH on the temporary PCell is to be released and reestablished on the original PCell. Thus, the UE 120 may deactivate the temporary PCell and revert the temporary PCell to the special SCell.

In some aspects, the message (e.g., the DCI) indicating the new beam may further indicate a new PUCCH group configuration for the first PUCCH group and the second PUCCH group. For example, the new PUCCH group configuration may be based at least in part on updated cell measurements, such as updated cell-level beam strength measurements associated with a cell, an updated quantity of beams available in a cell, or the like. The UE may then communicate based at least in part on the new PUCCH group configuration.

As shown by reference number 555, the base station 110 may transmit (e.g., during the BFR procedure and instead of transmitting the message indicating the new beam), and the UE 120 may receive, a message that indicates deactivation of the PUCCH SCell, the special SCell, or another SCell (e.g., another SCell on which the BFR message for the PCell was transmitted). The message indicating deactivation of the SCell may be a MAC-CE or DCI. The message indicating the deactivation of the SCell may indicate to the UE 120 that PCell BFR failed. Accordingly, in some aspects, the UE 120 may transmit, and the base station 110 may receive, one or more messages of a random access procedure for the PCell based at least in part on receiving the message indicating the deactivation of the SCell. In other words, if an SCell is deactivated while attempting PCell BFR using the SCell or the PCell BFR using the SCell otherwise fails (e.g., not successful), then the UE 120 may revert to performing a random access procedure for the PCell BFR.

As indicated above, FIG. 5 is provided as an example. Other examples may differ from what is described with respect to FIG. 5.

Figure 6:
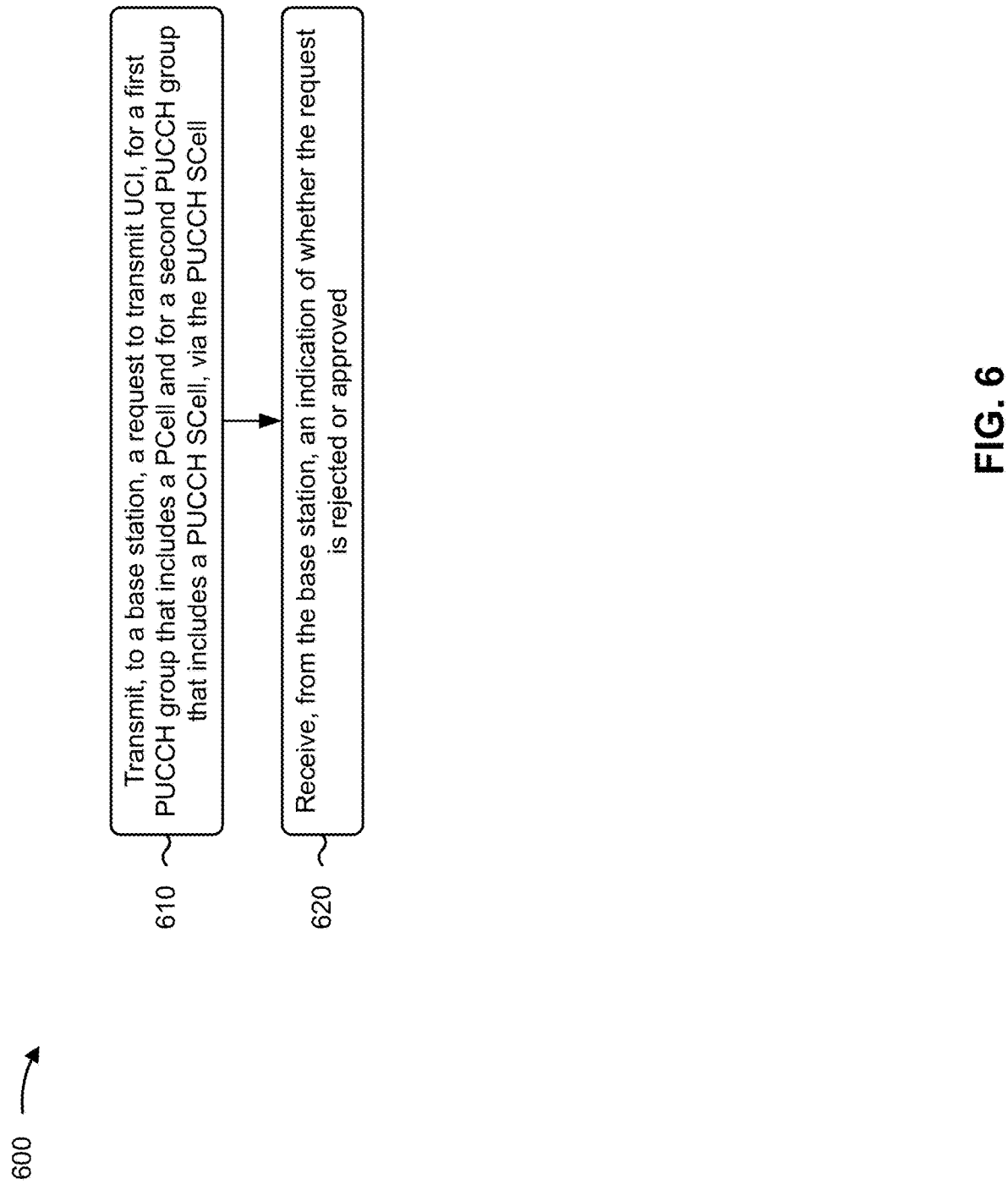
FIGS. 6-13 are diagrams illustrating example processes associated with beam failure recovery for a primary cell, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beam failure recovery for a primary cell.

As shown in FIG. 6, in some aspects, process 600 may include transmitting, to a base station, a request to transmit UCI, for a first PUCCH group that includes a PCell and for a second PUCCH group that includes a PUCCH SCell, via the PUCCH SCell (block 610). For example, the UE (e.g., using communication manager 140 and/or transmission component 1404, depicted in FIG. 14) may transmit, to a base station, a request to transmit UCI, for a first PUCCH group that includes a PCell and for a second PUCCH group that includes a PUCCH SCell, via the PUCCH SCell, as described above.

As further shown in FIG. 6, in some aspects, process 600 may include receiving, from the base station, an indication of whether the request is rejected or approved (block 620). For example, the UE (e.g., using communication manager 140 and/or reception component 1402, depicted in FIG. 14) may receive, from the base station, an indication of whether the request is rejected or approved, as described above.

Process 600 may include additional aspects, such as any single aspect or any combination of aspects described below and/or in connection with one or more other processes described elsewhere herein.

Figure 14:
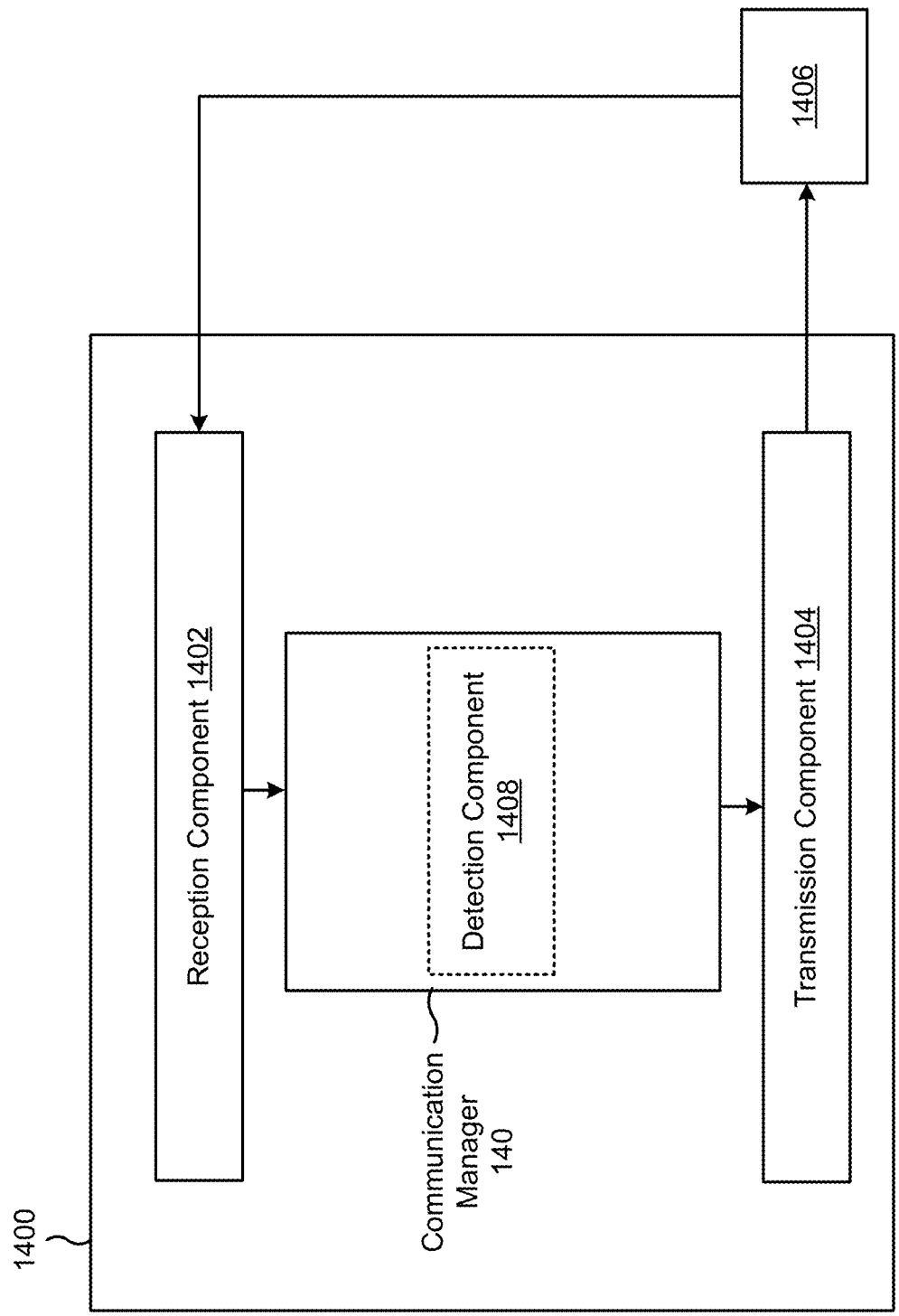
FIGS. 14-15 are diagrams of example apparatuses for wireless communication, in accordance with the present disclosure.

In a first aspect, process 600 includes receiving (e.g., using communication manager 140 and/or reception component 1402, depicted in FIG. 14), from the base station, a configuration for the first PUCCH group and for the second PUCCH group.

In a second aspect, alone or in combination with the first aspect, process 600 includes detecting (e.g., using communication manager 140 and/or detection component 1408, depicted in FIG. 14) a beam failure on the PCell, the request being transmitted based at least in part on the beam failure on the PCell.

In a third aspect, alone or in combination with one or more of the first and second aspects, process 600 includes transmitting (e.g., using communication manager 140 and/or transmission component 1404, depicted in FIG. 14), to the base station, one or more messages of a random access procedure for the PCell based at least in part on the indication indicating that the request is rejected.

In a fourth aspect, alone or in combination with one or more of the first through third aspects, process 600 includes transmitting (e.g., using communication manager 140 and/or transmission component 1404, depicted in FIG. 14), to the base station, the UCI via the PUCCH SCell based at least in part on the indication indicating that the request is approved.

In a fifth aspect, alone or in combination with one or more of the first through fourth aspects, process 600 includes transmitting (e.g., using communication manager 140 and/or transmission component 1404, depicted in FIG. 14), to the base station, a beam failure recovery message via the PUCCH SCell or another SCell based at least in part on the indication indicating that the request is approved.

In a sixth aspect, alone or in combination with one or more of the first through fifth aspects, the beam failure recovery message indicates one or more of a reason for a beam failure on the PCell, failed beam information associated with the beam failure on the PCell, or preferred beam information.

In a seventh aspect, alone or in combination with one or more of the first through sixth aspects, the beam failure recovery message is a MAC-CE.

In an eighth aspect, alone or in combination with one or more of the first through seventh aspects, process 600 includes receiving (e.g., using communication manager 140 and/or reception component 1402, depicted in FIG. 14), from the base station and based at least in part on the beam failure recovery message, a message that indicates a new beam for the PCell.

In a ninth aspect, alone or in combination with one or more of the first through eighth aspects, the message further indicates a new PUCCH group configuration for the first PUCCH group and for the second PUCCH group.

In a tenth aspect, alone or in combination with one or more of the first through ninth aspects, process 600 includes receiving (e.g., using communication manager 140 and/or reception component 1402, depicted in FIG. 14), from the base station, a message that indicates activation or deactivation of PCell beam failure recovery using an SCell, the beam failure recovery message being transmitted based at least in part on the message indicating activation of the PCell beam failure recovery using the SCell.

In an eleventh aspect, alone or in combination with one or more of the first through tenth aspects, process 600 includes transmitting (e.g., using communication manager 140 and/or transmission component 1404, depicted in FIG. 14), to the base station, a message requesting activation or deactivation of PCell beam failure recovery using an SCell.

In a twelfth aspect, alone or in combination with one or more of the first through eleventh aspects, process 600 includes receiving (e.g., using communication manager 140 and/or reception component 1402, depicted in FIG. 14), from the base station, a message that indicates deactivation of the PUCCH SCell, and transmitting (e.g., using communication manager 140 and/or transmission component 1404, depicted in FIG. 14), to the base station, one or more messages of a random access procedure for the PCell based at least in part on receiving the message that indicates deactivation of the PUCCH SCell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
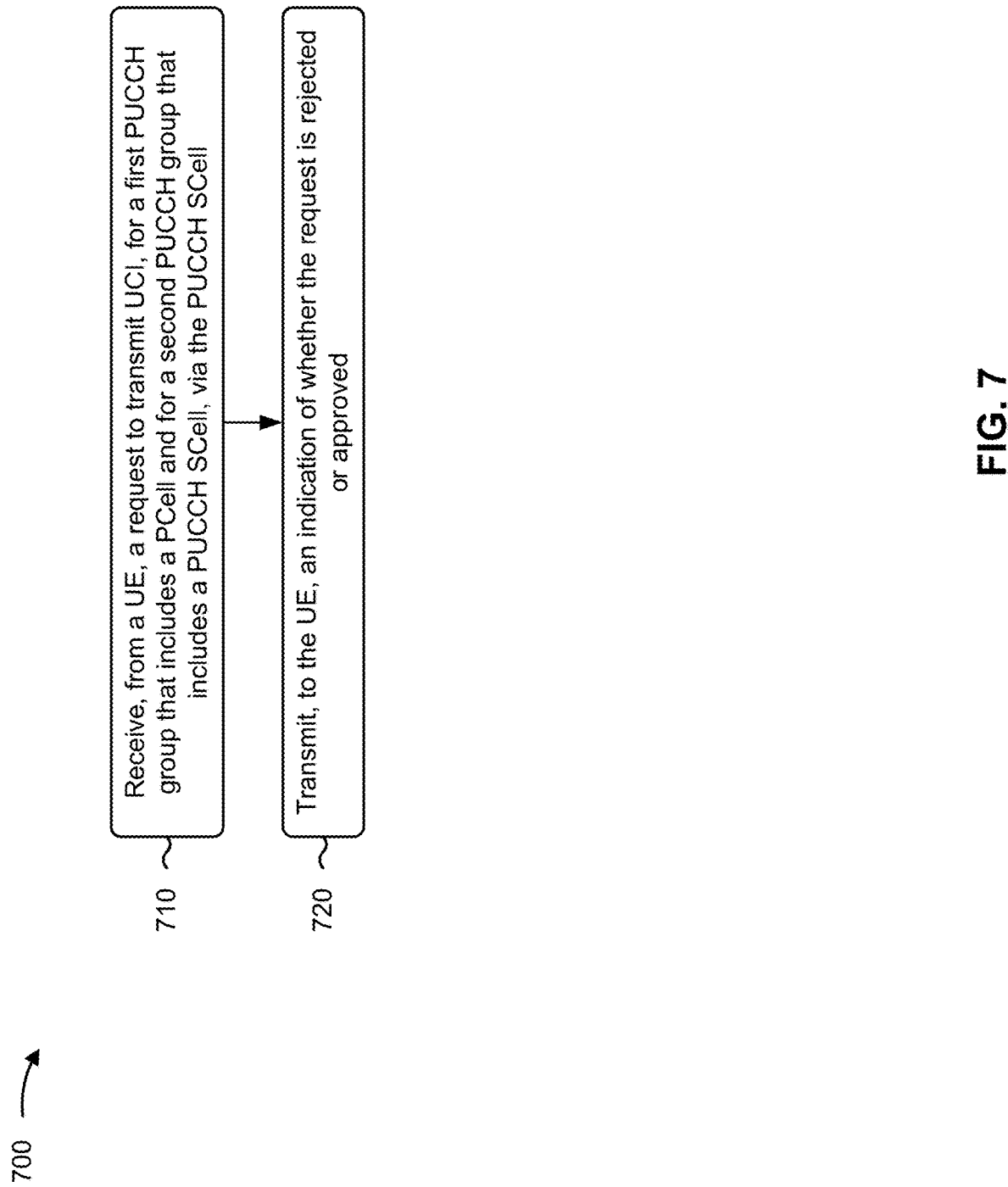

FIG. 7 is a diagram illustrating an example process 700 performed, for example, by a base station, in accordance with the present disclosure. Example process 700 is an example where the base station (e.g., base station 110) performs operations associated with beam failure recovery for a primary cell.

As shown in FIG. 7, in some aspects, process 700 may include receiving, from a UE, a request to transmit UCI, for a first PUCCH group that includes a PCell and for a second PUCCH group that includes a PUCCH SCell, via the PUCCH SCell (block 710). For example, the base station (e.g., using communication manager 150 and/or reception component 1502, depicted in FIG. 15) may receive, from a UE, a request to transmit UCI, for a first PUCCH group that includes a PCell and for a second PUCCH group that includes a PUCCH SCell, via the PUCCH SCell, as described above.

As further shown in FIG. 7, in some aspects, process 700 may include transmitting, to the UE, an indication of whether the request is rejected or approved (block 720). For example, the base station (e.g., using communication manager 150 and/or transmission component 1504, depicted in FIG. 15) may transmit, to the UE, an indication of whether the request is rejected or approved, as described above.

Process 700 may include additional aspects, such as any single aspect or any combination of aspects described below and/or in connection with one or more other processes described elsewhere herein.

Figure 15:
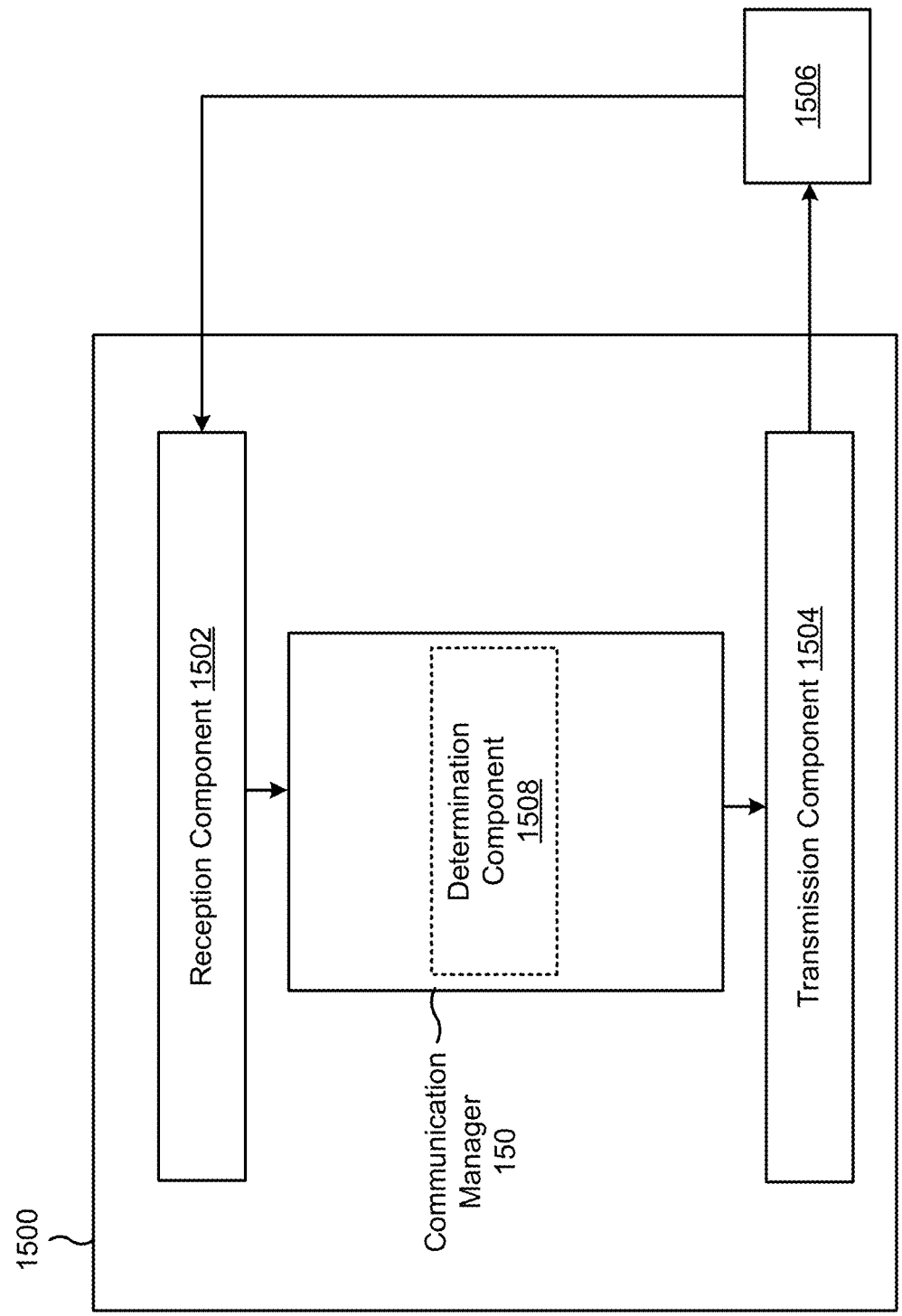

In a first aspect, process 700 includes transmitting (e.g., using communication manager 150 and/or transmission component 1504, depicted in FIG. 15), to the UE, a configuration for the first PUCCH group and for the second PUCCH group.

In a second aspect, alone or in combination with the first aspect, the request is rejected or approved based at least in part on a determination (e.g., using communication manager 150 and/or determination component 1508, depicted in FIG. 15) of whether the PUCCH SCell is capable of supporting the UCI.

In a third aspect, alone or in combination with one or more of the first and second aspects, process 700 includes receiving (e.g., using communication manager 150 and/or reception component 1502, depicted in FIG. 15), from the UE, one or more messages of a random access procedure for the PCell based at least in part on the indication indicating that the request is rejected.

In a fourth aspect, alone or in combination with one or more of the first through third aspects, process 700 includes receiving (e.g., using communication manager 150 and/or reception component 1502, depicted in FIG. 15), from the UE, the UCI via the PUCCH SCell based at least in part on the indication indicating that the request is approved.

In a fifth aspect, alone or in combination with one or more of the first through fourth aspects, process 700 includes receiving (e.g., using communication manager 150 and/or reception component 1502, depicted in FIG. 15), from the UE, a beam failure recovery message via the PUCCH SCell or another SCell based at least in part on the indication indicating that the request is approved.

In a sixth aspect, alone or in combination with one or more of the first through fifth aspects, the beam failure recovery message indicates one or more of a reason for a beam failure on the PCell, failed beam information associated with the beam failure on the PCell, or preferred beam information.

In a seventh aspect, alone or in combination with one or more of the first through sixth aspects, the beam failure recovery message is a MAC-CE.

In an eighth aspect, alone or in combination with one or more of the first through seventh aspects, process 700 includes transmitting (e.g., using communication manager 150 and/or transmission component 1504, depicted in FIG. 15), to the UE and based at least in part on the beam failure recovery message, a message that indicates a new beam for the PCell.

In a ninth aspect, alone or in combination with one or more of the first through eighth aspects, the message further indicates a new PUCCH group configuration for the first PUCCH group and for the second PUCCH group.

In a tenth aspect, alone or in combination with one or more of the first through ninth aspects, process 700 includes transmitting (e.g., using communication manager 150 and/or transmission component 1504, depicted in FIG. 15), to the UE, a message that indicates activation or deactivation of PCell beam failure recovery using an SCell, the beam failure recovery message being received based at least in part on the message indicating activation of the PCell beam failure recovery using the SCell.

In an eleventh aspect, alone or in combination with one or more of the first through tenth aspects, process 700 includes receiving (e.g., using communication manager 150 and/or reception component 1502, depicted in FIG. 15), from the UE, a message requesting activation or deactivation of PCell beam failure recovery using an SCell.

In a twelfth aspect, alone or in combination with one or more of the first through eleventh aspects, process 700 includes transmitting (e.g., using communication manager 150 and/or transmission component 1504, depicted in FIG. 15), to the UE, a message that indicates deactivation of the PUCCH SCell, and receiving (e.g., using communication manager 150 and/or reception component 1502, depicted in FIG. 15), from the UE, one or more messages of a random access procedure for the PCell based at least in part on transmitting the message that indicates deactivation of the PUCCH SCell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
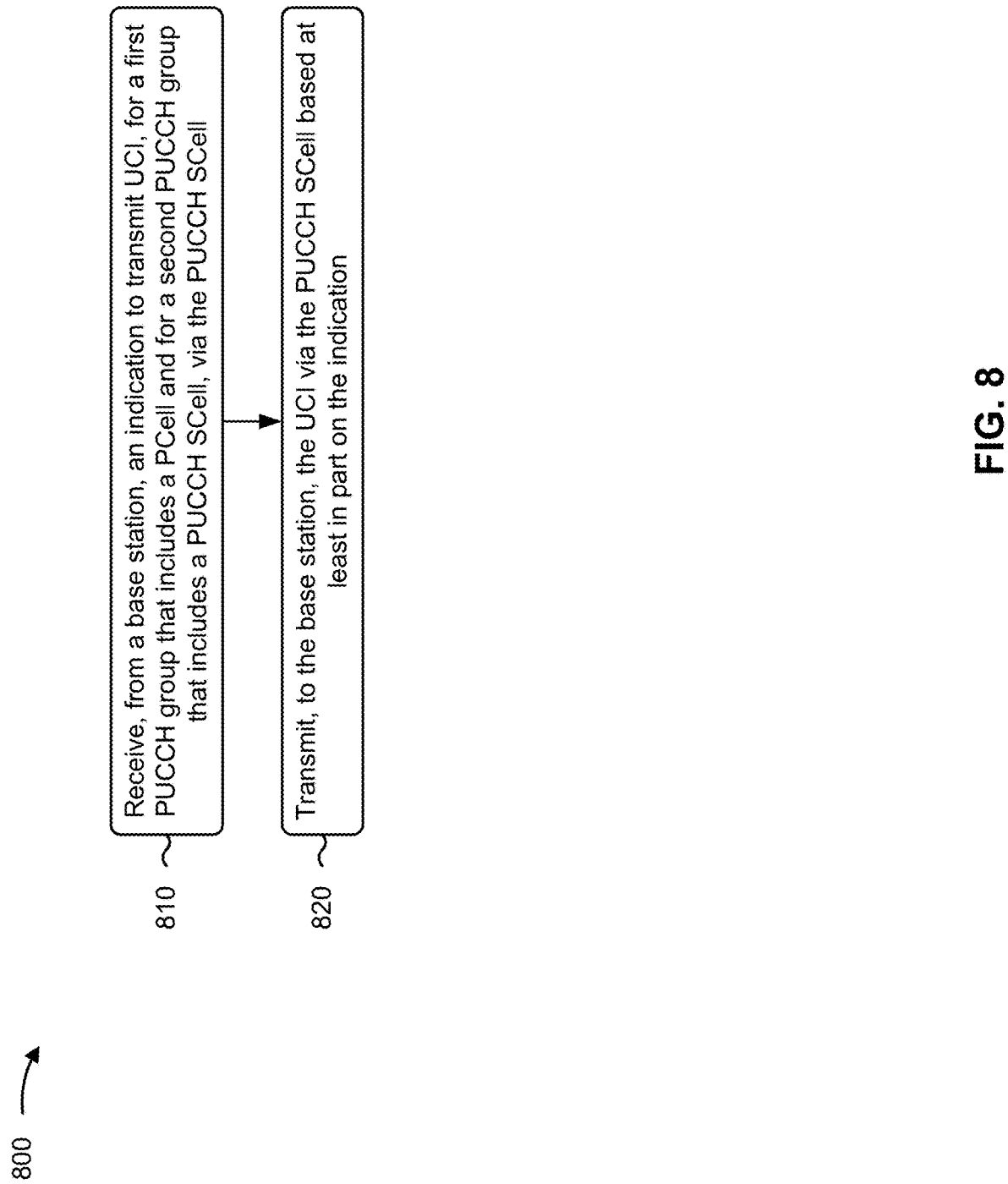

FIG. 8 is a diagram illustrating an example process 800 performed, for example, by a UE, in accordance with the present disclosure. Example process 800 is an example where the UE (e.g., UE 120) performs operations associated with beam failure recovery for a primary cell.

As shown in FIG. 8, in some aspects, process 800 may include receiving, from a base station, an indication to transmit UCI, for a first PUCCH group that includes a PCell and for a second PUCCH group that includes a PUCCH SCell, via the PUCCH SCell (block 810). For example, the UE (e.g., using communication manager 140 and/or reception component 1402, depicted in FIG. 14) may receive, from a base station, an indication to transmit UCI, for a first PUCCH group that includes a PCell and for a second PUCCH group that includes a PUCCH SCell, via the PUCCH SCell, as described above.

As further shown in FIG. 8, in some aspects, process 800 may include transmitting, to the base station, the UCI via the PUCCH SCell based at least in part on the indication (block 820). For example, the UE (e.g., using communication manager 140 and/or transmission component 1404, depicted in FIG. 14) may transmit, to the base station, the UCI via the PUCCH SCell based at least in part on the indication, as described above.

Process 800 may include additional aspects, such as any single aspect or any combination of aspects described below and/or in connection with one or more other processes described elsewhere herein.

In a first aspect, process 800 includes receiving (e.g., using communication manager 140 and/or reception component 1402, depicted in FIG. 14), from the base station, a configuration for the first PUCCH group and for the second PUCCH group.

In a second aspect, alone or in combination with the first aspect, process 800 includes detecting (e.g., using communication manager 140 and/or detection component 1408, depicted in FIG. 14) a beam failure on the PCell, the request being transmitted based at least in part on the beam failure on the PCell.

In a third aspect, alone or in combination with one or more of the first and second aspects, process 800 includes transmitting (e.g., using communication manager 140 and/or transmission component 1404, depicted in FIG. 14), to the base station, a beam failure recovery message via the PUCCH SCell or another SCell based at least in part on the indication.

In a fourth aspect, alone or in combination with one or more of the first through third aspects, the beam failure recovery message indicates one or more of a reason for a beam failure on the PCell, failed beam information associated with the beam failure on the PCell, or preferred beam information.

In a fifth aspect, alone or in combination with one or more of the first through fourth aspects, the beam failure recovery message is a MAC-CE.

In a sixth aspect, alone or in combination with one or more of the first through fifth aspects, process 800 includes receiving (e.g., using communication manager 140 and/or reception component 1402, depicted in FIG. 14), from the base station and based at least in part on the beam failure recovery message, a message that indicates a new beam for the PCell.

In a seventh aspect, alone or in combination with one or more of the first through sixth aspects, the message further indicates a new PUCCH group configuration for the first PUCCH group and for the second PUCCH group.

In an eighth aspect, alone or in combination with one or more of the first through seventh aspects, process 800 includes receiving (e.g., using communication manager 140 and/or reception component 1402, depicted in FIG. 14), from the base station, a message that indicates activation or deactivation of PCell beam failure recovery using an SCell, the beam failure recovery message being transmitted based at least in part on the message indicating activation of the PCell beam failure recovery using the SCell.

In a ninth aspect, alone or in combination with one or more of the first through eighth aspects, process 800 includes transmitting (e.g., using communication manager 140 and/or transmission component 1404, depicted in FIG. 14), to the base station, a message requesting activation or deactivation of PCell beam failure recovery using an SCell.

In a tenth aspect, alone or in combination with one or more of the first through ninth aspects, process 800 includes receiving (e.g., using communication manager 140 and/or reception component 1402, depicted in FIG. 14), from the base station, a message that indicates deactivation of the PUCCH SCell, and transmitting (e.g., using communication manager 140 and/or transmission component 1404, depicted in FIG. 14), to the base station, one or more messages of a random access procedure for the PCell based at least in part on receiving the message that indicates deactivation of the PUCCH SCell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
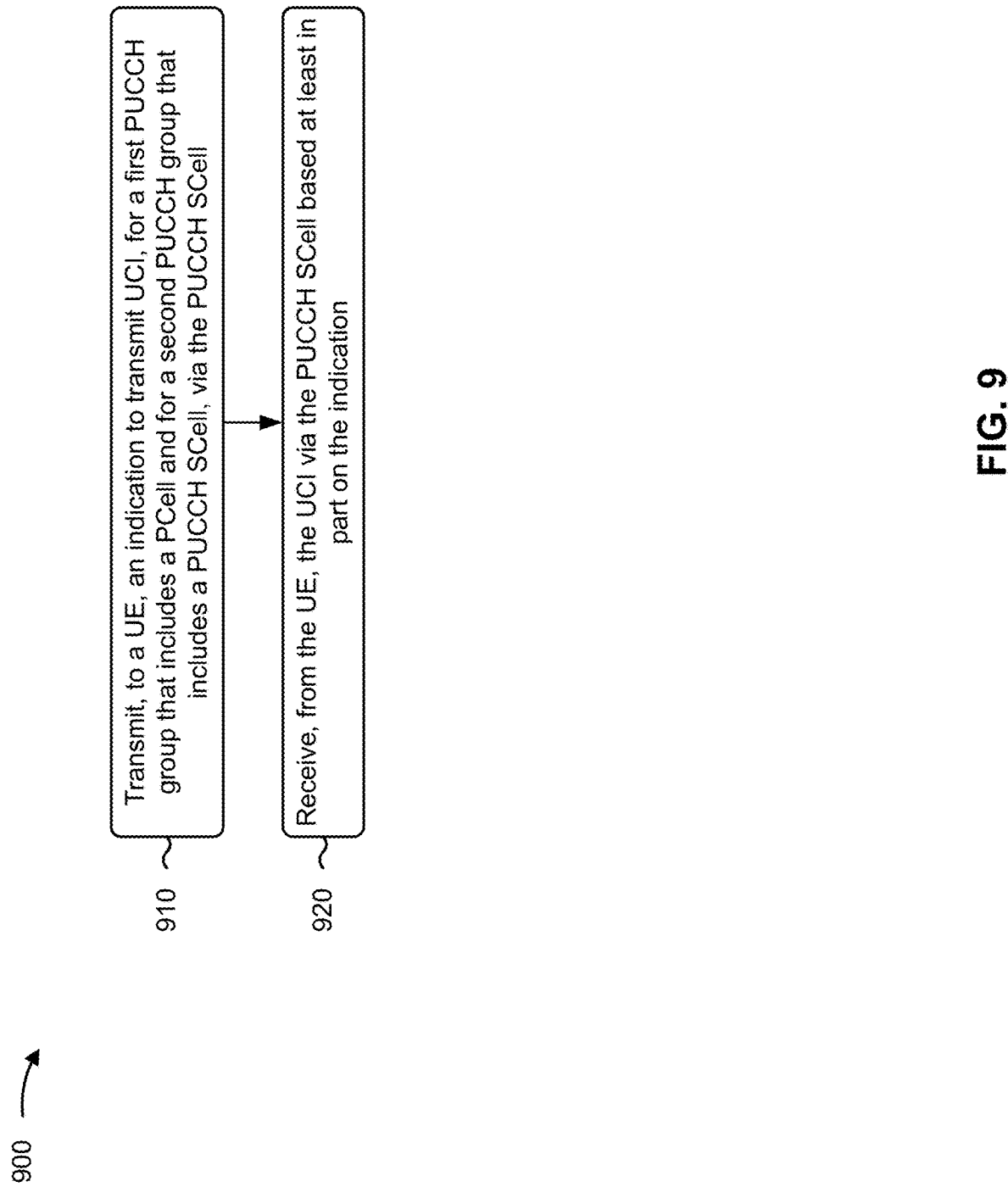

FIG. 9 is a diagram illustrating an example process 900 performed, for example, by a base station, in accordance with the present disclosure. Example process 900 is an example where the base station (e.g., base station 110) performs operations associated with beam failure recovery for a primary cell.

As shown in FIG. 9, in some aspects, process 900 may include transmitting, to a UE, an indication to transmit UCI, for a first PUCCH group that includes a PCell and for a second PUCCH group that includes a PUCCH SCell, via the PUCCH SCell (block 910). For example, the base station (e.g., using communication manager 150 and/or transmission component 1504, depicted in FIG. 15) may transmit, to a UE, an indication to transmit UCI, for a first PUCCH group that includes a PCell and for a second PUCCH group that includes a PUCCH SCell, via the PUCCH SCell, as described above.

As further shown in FIG. 9, in some aspects, process 900 may include receiving, from the UE, the UCI via the PUCCH SCell based at least in part on the indication (block 920). For example, the base station (e.g., using communication manager 150 and/or reception component 1502, depicted in FIG. 15) may receive, from the UE, the UCI via the PUCCH SCell based at least in part on the indication, as described above.

Process 900 may include additional aspects, such as any single aspect or any combination of aspects described below and/or in connection with one or more other processes described elsewhere herein.

In a first aspect, process 900 includes transmitting (e.g., using communication manager 150 and/or transmission component 1504, depicted in FIG. 15), to the UE, a configuration for the first PUCCH group and for the second PUCCH group.

In a second aspect, alone or in combination with the first aspect, process 900 includes receiving (e.g., using communication manager 150 and/or reception component 1502, depicted in FIG. 15), from the UE, a beam failure recovery message via the PUCCH SCell or another SCell based at least in part on the indication.

In a third aspect, alone or in combination with one or more of the first and second aspects, the beam failure recovery message indicates one or more of a reason for a beam failure on the PCell, failed beam information associated with the beam failure on the PCell, or preferred beam information.

In a fourth aspect, alone or in combination with one or more of the first through third aspects, the beam failure recovery message is a MAC-CE.

In a fifth aspect, alone or in combination with one or more of the first through fourth aspects, process 900 includes transmitting (e.g., using communication manager 150 and/or transmission component 1504, depicted in FIG. 15), to the UE and based at least in part on the beam failure recovery message, a message that indicates a new beam for the PCell.

In a sixth aspect, alone or in combination with one or more of the first through fifth aspects, the message further indicates a new PUCCH group configuration for the first PUCCH group and for the second PUCCH group.

In a seventh aspect, alone or in combination with one or more of the first through sixth aspects, process 900 includes transmitting (e.g., using communication manager 150 and/or transmission component 1504, depicted in FIG. 15), to the UE, a message that indicates activation or deactivation of PCell beam failure recovery using an SCell, the beam failure recovery message being received based at least in part on the message indicating activation of the PCell beam failure recovery using the SCell.

In an eighth aspect, alone or in combination with one or more of the first through seventh aspects, process 900 includes receiving (e.g., using communication manager 150 and/or reception component 1502, depicted in FIG. 15), from the UE, a message requesting activation or deactivation of PCell beam failure recovery using an SCell.

In a ninth aspect, alone or in combination with one or more of the first through eighth aspects, process 900 includes transmitting (e.g., using communication manager 150 and/or transmission component 1504, depicted in FIG. 15), to the UE, a message that indicates deactivation of the PUCCH SCell, and receiving (e.g., using communication manager 150 and/or reception component 1502, depicted in FIG. 15), from the UE, one or more messages of a random access procedure for the PCell based at least in part on transmitting the message that indicates deactivation of the PUCCH SCell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
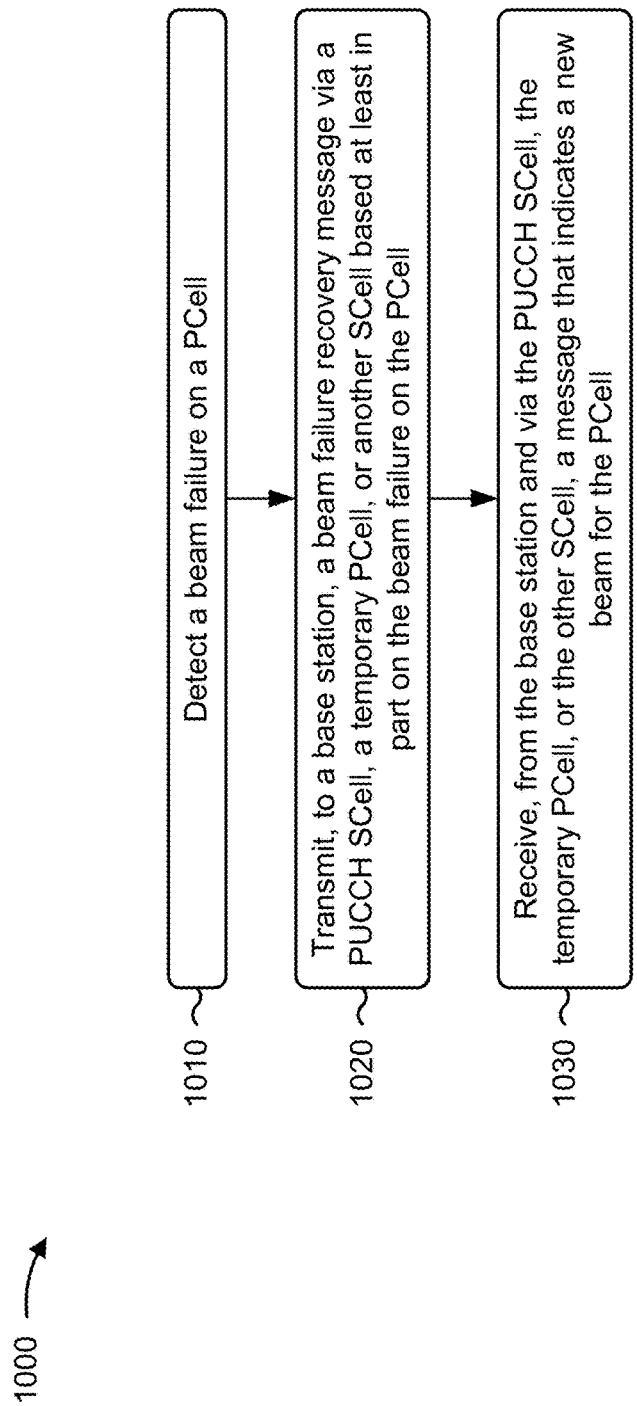

FIG. 10 is a diagram illustrating an example process 1000 performed, for example, by a UE, in accordance with the present disclosure. Example process 1000 is an example where the UE (e.g., UE 120) performs operations associated with beam failure recovery for a primary cell.

As shown in FIG. 10, in some aspects, process 1000 may include detecting a beam failure on a PCell (block 1010). For example, the UE (e.g., using communication manager 140 and/or detection component 1408, depicted in FIG. 14) may detect a beam failure on a PCell, as described above.

As further shown in FIG. 10, in some aspects, process 1000 may include transmitting, to a base station, a beam failure recovery message via a PUCCH SCell, a temporary PCell, or another SCell based at least in part on the beam failure on the PCell (block 1020). For example, the UE (e.g., using communication manager 140 and/or transmission component 1404, depicted in FIG. 14) may transmit, to a base station, a beam failure recovery message via a PUCCH SCell, a temporary PCell, or another SCell based at least in part on the beam failure on the PCell, as described above.

As further shown in FIG. 10, in some aspects, process 1000 may include receiving, from the base station and via the PUCCH SCell, the temporary PCell, or the other SCell, a message that indicates a new beam for the PCell (block 1030). For example, the UE (e.g., using communication manager 140 and/or reception component 1402, depicted in FIG. 14) may receive, from the base station and via the PUCCH SCell, the temporary PCell, or the other SCell, a message that indicates a new beam for the PCell, as described above.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
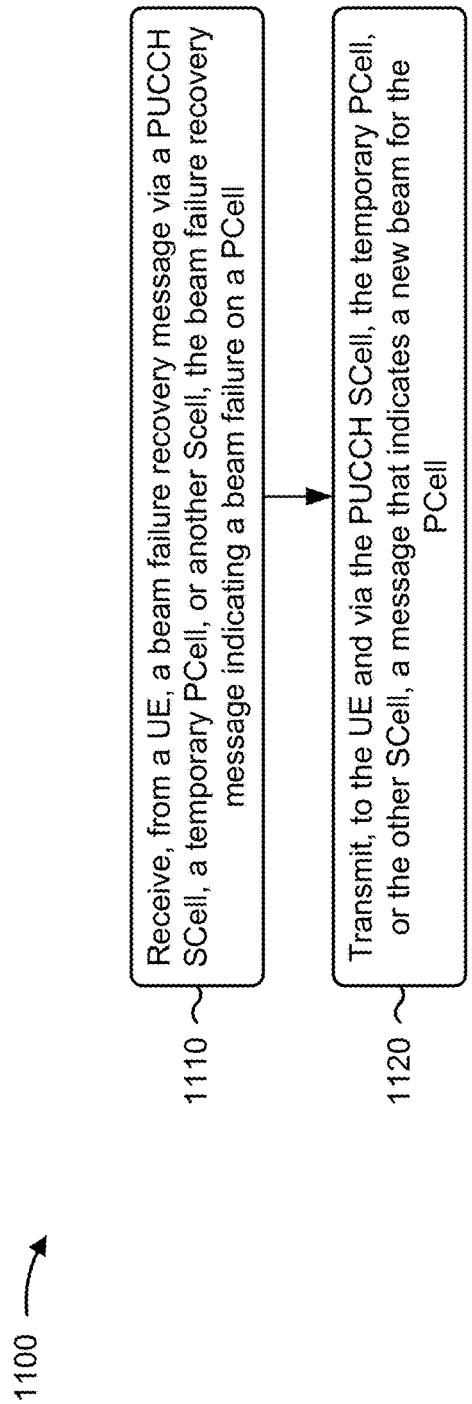

FIG. 11 is a diagram illustrating an example process 1100 performed, for example, by a base station, in accordance with the present disclosure. Example process 1100 is an example where the base station (e.g., base station 110) performs operations associated with beam failure recovery for a primary cell.

As shown in FIG. 11, in some aspects, process 1100 may include receiving, from a UE, a beam failure recovery message via a PUCCH SCell, a temporary PCell, or another SCell, the beam failure recovery message indicating a beam failure on a PCell (block 1110). For example, the base station (e.g., using communication manager 150 and/or reception component 1502, depicted in FIG. 15) may receive, from a UE, a beam failure recovery message via a PUCCH SCell, a temporary PCell, or another SCell, the beam failure recovery message indicating a beam failure on a PCell, as described above.

As further shown in FIG. 11, in some aspects, process 1100 may include transmitting, to the UE and via the PUCCH SCell, the temporary PCell, or the other SCell, a message that indicates a new beam for the PCell (block 1120). For example, the base station (e.g., using communication manager 150 and/or transmission component 1504, depicted in FIG. 15) may transmit, to the UE and via the PUCCH SCell, the temporary PCell, or the other SCell, a message that indicates a new beam for the PCell, as described above.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
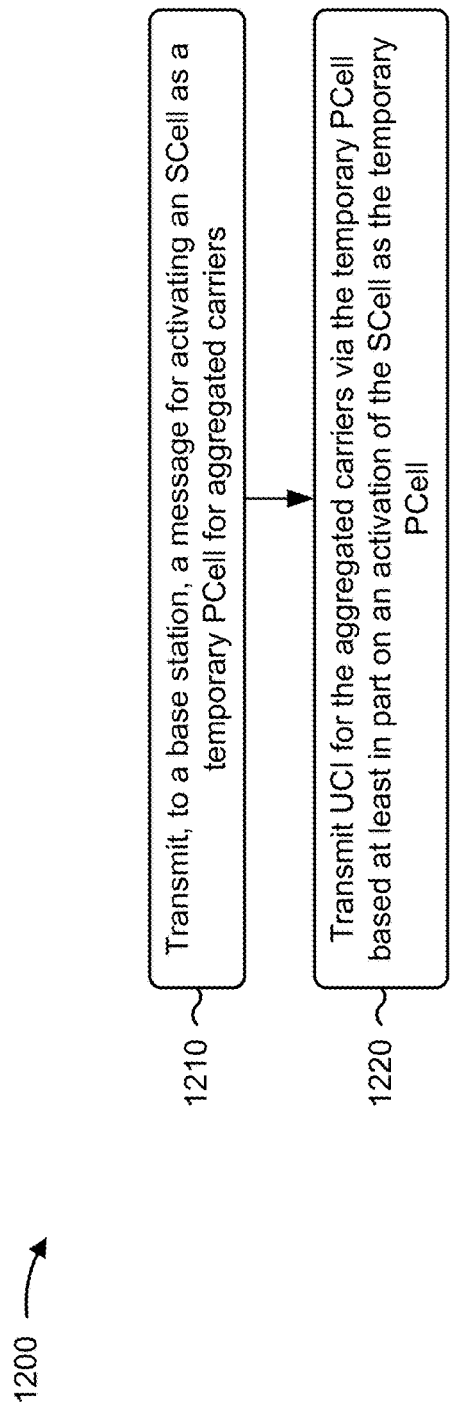

FIG. 12 is a diagram illustrating an example process 1200 performed, for example, by a UE, in accordance with the present disclosure. Example process 1200 is an example where the UE (e.g., UE 120) performs operations associated with beam failure recovery for a primary cell.

As shown in FIG. 12, in some aspects, process 1200 may include transmitting, to a base station, a message for activating an SCell as a temporary PCell for aggregated carriers (block 1210). For example, the UE (e.g., using communication manager 140 and/or transmission component 1404, depicted in FIG. 14) may transmit, to a base station, a message for activating an SCell as a temporary PCell for aggregated carriers, as described above.

As further shown in FIG. 12, in some aspects, process 1200 may include transmitting UCI for the aggregated carriers via the temporary PCell based at least in part on an activation of the SCell as the temporary PCell (block 1220). For example, the UE (e.g., using communication manager 140 and/or transmission component 1404, depicted in FIG. 14) may transmit UCI for the aggregated carriers via the temporary PCell based at least in part on an activation of the SCell as the temporary PCell, as described above.

Process 1200 may include additional aspects, such as any single aspect or any combination of aspects described below and/or in connection with one or more other processes described elsewhere herein.

In a first aspect, process 1200 includes receiving (e.g., using communication manager 140 and/or reception component 1402, depicted in FIG. 14), from the base station, a configuration indicating one or more SCells that are candidates for the temporary PCell.

In a second aspect, alone or in combination with the first aspect, process 1200 includes detecting (e.g., using communication manager 140 and/or detection component 1408, depicted in FIG. 14) a beam failure on the PCell, the message being transmitted based at least in part on the beam failure on the PCell.

In a third aspect, alone or in combination with one or more of the first and second aspects, process 1200 includes transmitting (e.g., using communication manager 140 and/or transmission component 1404, depicted in FIG. 14), to the base station, one or more messages of a random access procedure for the PCell based at least in part on an expiration of a timer that is initiated when the message is transmitted.

In a fourth aspect, alone or in combination with one or more of the first through third aspects, process 1200 includes transmitting (e.g., using communication manager 140 and/or transmission component 1404, depicted in FIG. 14), to the base station, a beam failure recovery message via the temporary PCell or another SCell based at least in part on the activation of the SCell as the temporary PCell.

In a fifth aspect, alone or in combination with one or more of the first through fourth aspects, the beam failure recovery message indicates one or more of a reason for a beam failure on the PCell, failed beam information associated with the beam failure on the PCell, or preferred beam information.

In a sixth aspect, alone or in combination with one or more of the first through fifth aspects, the beam failure recovery message is a MAC-CE.

In a seventh aspect, alone or in combination with one or more of the first through sixth aspects, process 1200 includes receiving (e.g., using communication manager 140 and/or reception component 1402, depicted in FIG. 14), from the base station and based at least in part on the beam failure recovery message, a message that indicates a new beam for the PCell.

In an eighth aspect, alone or in combination with one or more of the first through seventh aspects, the message indicates the SCell that is to be activated as the temporary PCell.

In a ninth aspect, alone or in combination with one or more of the first through eighth aspects, process 1200 includes receiving (e.g., using communication manager 140 and/or reception component 1402, depicted in FIG. 14), from the base station, an indication of the SCell that is to be activated as the temporary PCell.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
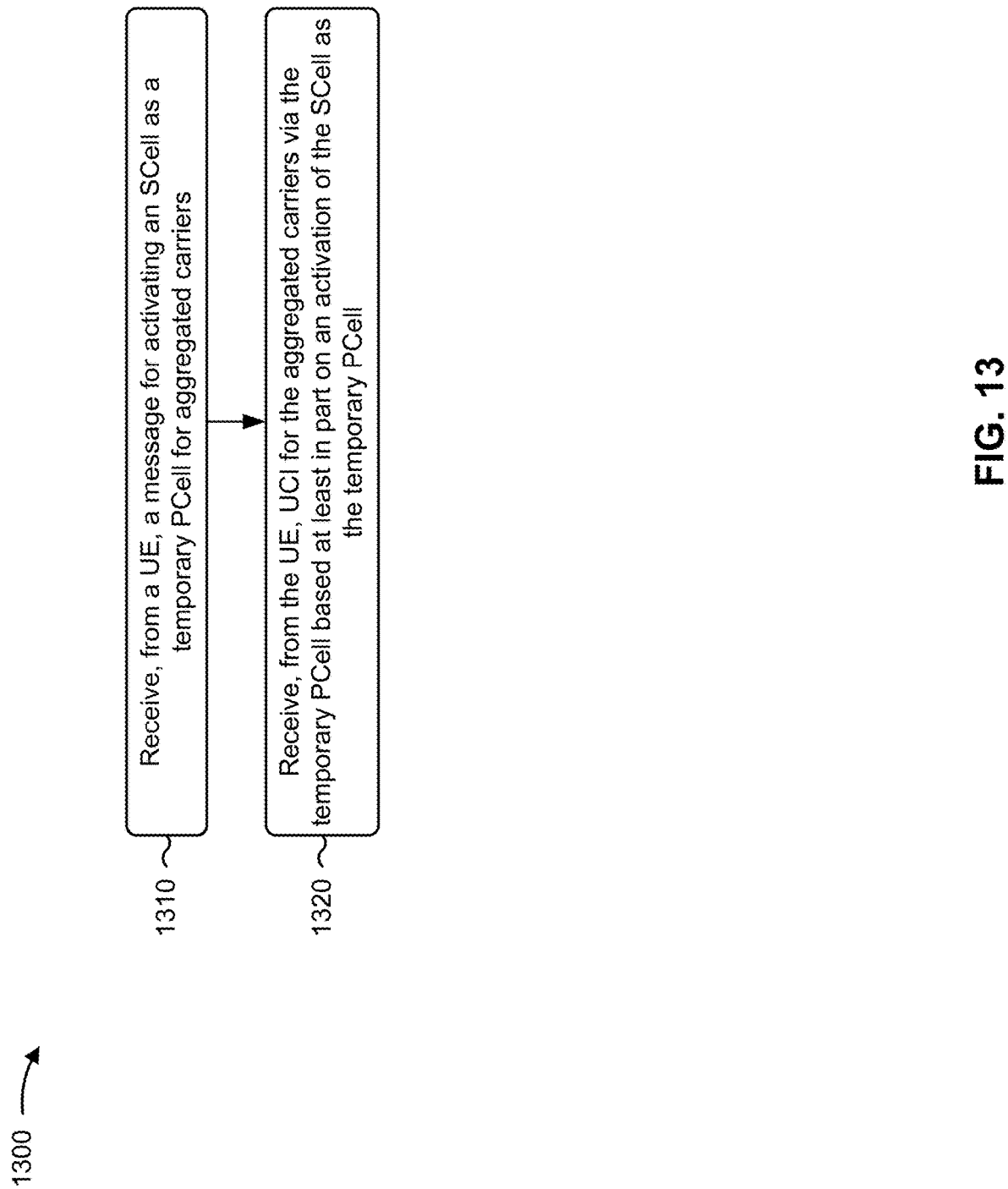

FIG. 13 is a diagram illustrating an example process 1300 performed, for example, by a base station, in accordance with the present disclosure. Example process 1300 is an example where the base station (e.g., base station 110) performs operations associated with beam failure recovery for a primary cell.

As shown in FIG. 13, in some aspects, process 1300 may include receiving, from a UE, a message for activating an SCell as a temporary PCell for aggregated carriers (block 1310). For example, the base station (e.g., using communication manager 150 and/or reception component 1502, depicted in FIG. 15) may receive, from a UE, a message for activating an SCell as a temporary PCell for aggregated carriers, as described above.

As further shown in FIG. 13, in some aspects, process 1300 may include receiving, from the UE, UCI for the aggregated carriers via the temporary PCell based at least in part on an activation of the SCell as the temporary PCell (block 1320). For example, the base station (e.g., using communication manager 150 and/or reception component 1502, depicted in FIG. 15) may receive UCI for the aggregated carriers via the temporary PCell based at least in part on an activation of the SCell as the temporary PCell, as described above.

Process 1300 may include additional aspects, such as any single aspect or any combination of aspects described below and/or in connection with one or more other processes described elsewhere herein.

In a first aspect, process 1300 includes transmitting (e.g., using communication manager 150 and/or transmission component 1504, depicted in FIG. 15), to the UE, a configuration indicating one or more SCells that are candidates for the temporary PCell.

In a second aspect, alone or in combination with the first aspect, process 1300 includes receiving (e.g., using communication manager 150 and/or reception component 1502, depicted in FIG. 15), from the UE, one or more messages of a random access procedure for the PCell based at least in part on an expiration of a timer that is initiated when the message is transmitted.

In a third aspect, alone or in combination with one or more of the first and second aspects, process 1300 includes receiving (e.g., using communication manager 150 and/or reception component 1502, depicted in FIG. 15), from the UE, a beam failure recovery message via the temporary PCell or another SCell based at least in part on the activation of the SCell as the temporary PCell.

In a fourth aspect, alone or in combination with one or more of the first through third aspects, the beam failure recovery message indicates one or more of a reason for a beam failure on the PCell, failed beam information associated with the beam failure on the PCell, or preferred beam information.

In a fifth aspect, alone or in combination with one or more of the first through fourth aspects, the beam failure recovery message is a MAC-CE.

In a sixth aspect, alone or in combination with one or more of the first through fifth aspects, process 1300 includes transmitting (e.g., using communication manager 150 and/or transmission component 1504, depicted in FIG. 15), to the UE and based at least in part on the beam failure recovery message, a message that indicates a new beam for the PCell.

In a seventh aspect, alone or in combination with one or more of the first through sixth aspects, the message indicates the SCell that is to be activated as the temporary PCell.

In an eighth aspect, alone or in combination with one or more of the first through seventh aspects, process 1300 includes transmitting (e.g., using communication manager 150 and/or transmission component 1504, depicted in FIG. 15), to the UE, an indication of the SCell that is to be activated as the temporary PCell.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a detection component 1408, among other examples.

In some aspects, the apparatus 1400 may be configured to perform one or more operations described herein in connection with FIG. 5. Additionally, or alternatively, the apparatus 1400 may be configured to perform one or more processes described herein, such as process 600 of FIG. 6, process 800 of FIG. 8, process 1000 of FIG. 10, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The transmission component 1404 may transmit, to a base station, a request to transmit UCI, for a first PUCCH group that includes a PCell and for a second PUCCH group that includes a PUCCH SCell, via the PUCCH SCell. The reception component 1402 may receive, from the base station, an indication of whether the request is rejected or approved. In some aspects, the reception component 1402 may receive, from a base station, an indication to transmit UCI, for a first PUCCH group that includes a PCell and for a second PUCCH group that includes a PUCCH SCell, via the PUCCH SCell (e.g., an indication that the request is approved). The transmission component 1404 may transmit, to the base station, the UCI via the PUCCH SCell based at least in part on the indication.

The reception component 1402 may receive, from the base station, a configuration for the first PUCCH group and for the second PUCCH group.

The detection component 1408 may detect a beam failure on the PCell, the request being transmitted based at least in part on the beam failure on the PCell.

The transmission component 1404 may transmit, to the base station, one or more messages of a random access procedure for the PCell based at least in part on the indication indicating that the request is rejected.

The transmission component 1404 may transmit, to the base station, the UCI via the PUCCH SCell based at least in part on the indication indicating that the request is approved.

The transmission component 1404 may transmit, to the base station, a beam failure recovery message via the PUCCH SCell or another SCell based at least in part on the indication indicating that the request is approved.

The reception component 1402 may receive, from the base station and based at least in part on the beam failure recovery message, a message that indicates a new beam for the PCell.

The reception component 1402 may receive, from the base station, a message that indicates activation or deactivation of PCell beam failure recovery using an SCell, the beam failure recovery message being transmitted based at least in part on the message indicating activation of the PCell beam failure recovery using the SCell.

The transmission component 1404 may transmit, to the base station, a message requesting activation or deactivation of PCell beam failure recovery using an SCell.

The reception component 1402 may receive, from the base station, a message that indicates deactivation of the PUCCH SCell.

The transmission component 1404 may transmit, to the base station, one or more messages of a random access procedure for the PCell based at least in part on receiving the message that indicates deactivation of the PUCCH SCell.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

FIG. 15 is a diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include a determination component 1508, among other examples.

In some aspects, the apparatus 1500 may be configured to perform one or more operations described herein in connection with FIG. 5. Additionally, or alternatively, the apparatus 1500 may be configured to perform one or more processes described herein, such as process 700 of FIG. 7, process 900 of FIG. 9, process 1100 of FIG. 11, process 1300 of FIG. 13, or a combination thereof. In some aspects, the apparatus 1500 and/or one or more components shown in FIG. 15 may include one or more components of the base station described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the base station described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the base station described in connection with FIG. 2. In some aspects, the transmission component 1504 may be co-located with the reception component 1502 in a transceiver.

The reception component 1502 may receive, from a UE, a request to transmit UCI, for a first PUCCH group that includes a PCell and for a second PUCCH group that includes a PUCCH SCell, via the PUCCH SCell. The transmission component 1504 may transmit, to the UE, an indication of whether the request is rejected or approved. In some aspects, the transmission component 1504 may transmit, to a UE, an indication to transmit UCI, for a first PUCCH group that includes a PCell and for a second PUCCH group that includes a PUCCH SCell, via the PUCCH SCell (e.g., an indication that the request is approved). The reception component 1502 may receive, from the UE, the UCI via the PUCCH SCell based at least in part on the indication.

The transmission component 1504 may transmit, to the UE, a configuration for the first PUCCH group and for the second PUCCH group.

The determination component 1508 may determine whether the PUCCH SCell is capable of supporting the UCI.

The reception component 1502 may receive, from the UE, one or more messages of a random access procedure for the PCell based at least in part on the indication indicating that the request is rejected.

The reception component 1502 may receive, from the UE, the UCI via the PUCCH SCell based at least in part on the indication indicating that the request is approved.

The reception component 1502 may receive, from the UE, a beam failure recovery message via the PUCCH SCell or another SCell based at least in part on the indication indicating that the request is approved.

The transmission component 1504 may transmit, to the UE and based at least in part on the beam failure recovery message, a message that indicates a new beam for the PCell.

The transmission component 1504 may transmit, to the UE, a message that indicates activation or deactivation of PCell beam failure recovery using an SCell, the beam failure recovery message being received based at least in part on the message indicating activation of the PCell beam failure recovery using the SCell.

The reception component 1502 may receive, from the UE, a message requesting activation or deactivation of PCell beam failure recovery using an SCell.

The transmission component 1504 may transmit, to the UE, a message that indicates deactivation of the PUCCH SCell.

The reception component 1502 may receive, from the UE, one or more messages of a random access procedure for the PCell based at least in part on transmitting the message that indicates deactivation of the PUCCH SCell.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by an apparatus of a user equipment (UE), comprising: transmitting, to a base station, a request to transmit uplink control information (UCI), for a first physical uplink control channel (PUCCH) group that includes a primary cell (PCell) and for a second PUCCH group that includes a PUCCH secondary cell (SCell), via the PUCCH SCell; and receiving, from the base station, an indication of whether the request is rejected or approved.

Aspect 2: The method of Aspect 1, further comprising: receiving, from the base station, a configuration for the first PUCCH group and for the second PUCCH group.

Aspect 3: The method of any of Aspects 1-2, further comprising: detecting a beam failure on the PCell, the request being transmitted based at least in part on the beam failure on the PCell.

Aspect 4: The method of any of Aspects 1-3, further comprising: transmitting, to the base station, one or more messages of a random access procedure for the PCell based at least in part on the indication indicating that the request is rejected.

Aspect 5: The method of any of Aspects 1-3, further comprising: transmitting, to the base station, the UCI via the PUCCH SCell based at least in part on the indication indicating that the request is approved.

Aspect 6: The method of any of Aspects 1-3 or 5, further comprising: transmitting, to the base station, a beam failure recovery message via the PUCCH SCell or another SCell based at least in part on the indication indicating that the request is approved.

Aspect 7: The method of Aspect 6, wherein the beam failure recovery message indicates one or more of: a reason for a beam failure on the PCell, failed beam information associated with the beam failure on the PCell, or preferred beam information.

Aspect 8: The method of any of Aspects 6-7, wherein the beam failure recovery message is a medium access control control element (MAC-CE).

Aspect 9: The method of any of Aspects 6-8, further comprising: receiving, from the base station and based at least in part on the beam failure recovery message, a message that indicates a new beam for the PCell.

Aspect 10: The method of Aspect 9, wherein the message further indicates a new PUCCH group configuration for the first PUCCH group and for the second PUCCH group.

Aspect 11: The method of any of Aspects 6-10, further comprising: receiving, from the base station, a message that indicates activation or deactivation of PCell beam failure recovery using an SCell, the beam failure recovery message being transmitted based at least in part on the message indicating activation of the PCell beam failure recovery using the SCell.

Aspect 12: The method of any of Aspects 1-11, further comprising: transmitting, to the base station, a message requesting activation or deactivation of PCell beam failure recovery using an SCell.

Aspect 13: The method of any of Aspects 1-12, further comprising: receiving, from the base station, a message that indicates deactivation of the PUCCH SCell; and transmitting, to the base station, one or more messages of a random access procedure for the PCell based at least in part on receiving the message that indicates deactivation of the PUCCH SCell.

Aspect 14: A method of wireless communication performed by an apparatus of a base station, comprising: receiving, from a user equipment (UE), a request to transmit uplink control information (UCI), for a first physical uplink control channel (PUCCH) group that includes a primary cell (PCell) and for a second PUCCH group that includes a PUCCH secondary cell (SCell), via the PUCCH SCell; and transmitting, to the UE, an indication of whether the request is rejected or approved.

Aspect 15: The method of Aspect 14, further comprising: transmitting, to the UE, a configuration for the first PUCCH group and for the second PUCCH group.

Aspect 16: The method of any of Aspects 14-15, wherein the request is rejected or approved based at least in part on a determination of whether the PUCCH SCell is capable of supporting the UCI.

Aspect 17: The method of any of Aspects 14-16, further comprising: receiving, from the UE, one or more messages of a random access procedure for the PCell based at least in part on the indication indicating that the request is rejected.

Aspect 18: The method of any of Aspects 14-16, further comprising: receiving, from the UE, the UCI via the PUCCH SCell based at least in part on the indication indicating that the request is approved.

Aspect 19: The method of any of Aspects 14-16 or 18, further comprising: receiving, from the UE, a beam failure recovery message via the PUCCH SCell or another SCell based at least in part on the indication indicating that the request is approved.

Aspect 20: The method of Aspect 19, wherein the beam failure recovery message indicates one or more of: a reason for a beam failure on the PCell, failed beam information associated with the beam failure on the PCell, or preferred beam information.

Aspect 21: The method of any of Aspects 19-20, wherein the beam failure recovery message is a medium access control control element (MAC-CE).

Aspect 22: The method of any of Aspects 19-21, further comprising: transmitting, to the UE and based at least in part on the beam failure recovery message, a message that indicates a new beam for the PCell.

Aspect 23: The method of Aspect 22, wherein the message further indicates a new PUCCH group configuration for the first PUCCH group and for the second PUCCH group.

Aspect 24: The method of any of Aspects 19-23, further comprising: transmitting, to the UE, a message that indicates activation or deactivation of PCell beam failure recovery using an SCell, the beam failure recovery message being received based at least in part on the message indicating activation of the PCell beam failure recovery using the SCell.

Aspect 25: The method of any of Aspects 14-24, further comprising: receiving, from the UE, a message requesting activation or deactivation of PCell beam failure recovery using an SCell.

Aspect 26: The method of any of Aspects 14-25, further comprising: transmitting, to the UE, a message that indicates deactivation of the PUCCH SCell; and receiving, from the UE, one or more messages of a random access procedure for the PCell based at least in part on transmitting the message that indicates deactivation of the PUCCH SCell.

Aspect 27: A method of wireless communication performed by an apparatus of a user equipment (UE), comprising: receiving, from a base station, an indication to transmit uplink control information (UCI), for a first physical uplink control channel (PUCCH) group that includes a primary cell (PCell) and for a second PUCCH group that includes a PUCCH secondary cell (SCell), via the PUCCH SCell; and transmitting, to the base station, the UCI via the PUCCH SCell based at least in part on the indication.

Aspect 28: The method of Aspect 27, further comprising: receiving, from the base station, a configuration for the first PUCCH group and for the second PUCCH group.

Aspect 29: The method of any of Aspects 27-28, further comprising: detecting a beam failure on the PCell, the request being transmitted based at least in part on the beam failure on the PCell.

Aspect 30: The method of any of Aspects 27-29, further comprising: transmitting, to the base station, a beam failure recovery message via the PUCCH SCell or another SCell based at least in part on the indication.

Aspect 31: The method of Aspect 30, wherein the beam failure recovery message indicates one or more of: a reason for a beam failure on the PCell, failed beam information associated with the beam failure on the PCell, or preferred beam information.

Aspect 32: The method of any of Aspects 30-31, wherein the beam failure recovery message is a medium access control control element (MAC-CE).

Aspect 33: The method of any of Aspects 30-32, further comprising: receiving, from the base station and based at least in part on the beam failure recovery message, a message that indicates a new beam for the PCell.

Aspect 34: The method of Aspect 33, wherein the message further indicates a new PUCCH group configuration for the first PUCCH group and for the second PUCCH group.

Aspect 35: The method of any of Aspects 30-34, further comprising: receiving, from the base station, a message that indicates activation or deactivation of PCell beam failure recovery using an SCell, the beam failure recovery message being transmitted based at least in part on the message indicating activation of the PCell beam failure recovery using the SCell.

Aspect 36: The method of any of Aspects 27-35, further comprising: transmitting, to the base station, a message requesting activation or deactivation of PCell beam failure recovery using an SCell.

Aspect 37: The method of any of Aspects 27-36, further comprising: receiving, from the base station, a message that indicates deactivation of the PUCCH SCell; and transmitting, to the base station, one or more messages of a random access procedure for the PCell based at least in part on receiving the message that indicates deactivation of the PUCCH SCell.

Aspect 38: A method of wireless communication performed by an apparatus of a base station, comprising: transmitting, to a user equipment (UE), an indication to transmit uplink control information (UCI), for a first physical uplink control channel (PUCCH) group that includes a primary cell (PCell) and for a second PUCCH group that includes a PUCCH secondary cell (SCell), via the PUCCH SCell; and receiving, from the UE, the UCI via the PUCCH SCell based at least in part on the indication.

Aspect 39: The method of Aspect 38, further comprising: transmitting, to the UE, a configuration for the first PUCCH group and for the second PUCCH group.

Aspect 40: The method of any of Aspects 38-39, further comprising: receiving, from the UE, a beam failure recovery message via the PUCCH SCell or another SCell based at least in part on the indication.

Aspect 41: The method of Aspect 40, wherein the beam failure recovery message indicates one or more of: a reason for a beam failure on the PCell, failed beam information associated with the beam failure on the PCell, or preferred beam information.

Aspect 42: The method of any of Aspects 40-41, wherein the beam failure recovery message is a medium access control control element (MAC-CE).

Aspect 43: The method of any of Aspects 40-42, further comprising: transmitting, to the UE and based at least in part on the beam failure recovery message, a message that indicates a new beam for the PCell.

Aspect 44: The method of Aspect 43, wherein the message further indicates a new PUCCH group configuration for the first PUCCH group and for the second PUCCH group.

Aspect 45: The method of any of Aspects 40-44, further comprising: transmitting, to the UE, a message that indicates activation or deactivation of PCell beam failure recovery using an SCell, the beam failure recovery message being received based at least in part on the message indicating activation of the PCell beam failure recovery using the SCell.

Aspect 46: The method of any of Aspects 38-45, further comprising: receiving, from the UE, a message requesting activation or deactivation of PCell beam failure recovery using an SCell.

Aspect 47: The method of any of Aspects 38-46, further comprising: transmitting, to the UE, a message that indicates deactivation of the PUCCH SCell; and receiving, from the UE, one or more messages of a random access procedure for the PCell based at least in part on transmitting the message that indicates deactivation of the PUCCH SCell.

Aspect 48: A method for wireless communication performed by an apparatus of a user equipment (UE), comprising: detecting a beam failure on a primary cell (PCell); transmitting, to a base station, a beam failure recovery message via a physical uplink control channel (PUCCH)

secondary cell (SCell), a temporary PCell, or another SCell based at least in part on the beam failure on the PCell; and receiving, from the base station and via the PUCCH SCell, the temporary PCell, or the other SCell, a message that indicates a new beam for the PCell.

Aspect 49: A method for wireless communication performed by an apparatus of a base station, comprising: receiving, from a user equipment (UE), a beam failure recovery message via a physical uplink control channel (PUCCH) secondary cell (SCell), a temporary primary cell (PCell), or another SCell, the beam failure recovery message indicating a beam failure on a PCell; and transmitting, to the UE and via the PUCCH SCell, the temporary PCell, or the other SCell, a message that indicates a new beam for the PCell.

Aspect 50: A method for wireless communication performed by a user equipment (UE), comprising: transmitting, to a base station, a message for activating an SCell as a temporary PCell for aggregated carriers; and transmitting UCI for the aggregated carriers via the temporary PCell based at least in part on an activation of the SCell as the temporary PCell.

Aspect 51: The method of Aspect 50, further comprising: receiving, from the base station, a configuration indicating one or more SCells that are candidates for the temporary PCell.

Aspect 52: The method of any of Aspects 50-51, further comprising: detecting a beam failure on the PCell, the message being transmitted based at least in part on the beam failure on the PCell.

Aspect 53: The method of any of Aspects 50-52, further comprising: transmitting, to the base station, one or more messages of a random access procedure for the PCell based at least in part on an expiration of a timer that is initiated when the message is transmitted.

Aspect 54: The method of any of Aspects 50-52, further comprising: transmitting, to the base station, a beam failure recovery message via the temporary PCell or another SCell based at least in part on the activation of the SCell as the temporary PCell.

Aspect 55: The method of Aspect 54, wherein the beam failure recovery message indicates one or more of: a reason for a beam failure on the PCell, failed beam information associated with the beam failure on the PCell, or preferred beam information.

Aspect 56: The method of any of Aspects 54-55, wherein the beam failure recovery message is a medium access control control element (MAC-CE).

Aspect 57: The method of any of Aspects 54-56, further comprising: receiving, from the base station and based at least in part on the beam failure recovery message, a message that indicates a new beam for the PCell.

Aspect 58: The method of any of Aspects 50-57, wherein the message indicates the SCell that is to be activated as the temporary PCell.

Aspect 59: The method of any of Aspects 50-57, further comprising: receiving, from the base station, an indication of the SCell that is to be activated as the temporary PCell.

Aspect 60: A method for wireless communication performed by a base station, comprising: receiving, from a UE, a message for activating an SCell as a temporary PCell for aggregated carriers; and receiving, from the UE, UCI for the aggregated carriers via the temporary PCell based at least in part on an activation of the SCell as the temporary PCell.

Aspect 61: The method of Aspect 60, further comprising: transmitting, to the UE, a configuration indicating one or more SCells that are candidates for the temporary PCell.

Aspect 62: The method of any of Aspects 60-61, further comprising: receiving, from the UE, one or more messages of a random access procedure for the PCell based at least in part on an expiration of a timer that is initiated when the message is transmitted.

Aspect 63: The method of any of Aspects 60-61, further comprising: receiving, from the UE, a beam failure recovery message via the temporary PCell or another SCell based at least in part on the activation of the SCell as the temporary PCell.

Aspect 64: The method of Aspect 63, wherein the beam failure recovery message indicates one or more of: a reason for a beam failure on the PCell, failed beam information associated with the beam failure on the PCell, or preferred beam information.

Aspect 65: The method of any of Aspects 63-64, wherein the beam failure recovery message is a medium access control control element (MAC-CE).

Aspect 66: The method of any of Aspects 63-65, further comprising: transmitting, to the UE and based at least in part on the beam failure recovery message, a message that indicates a new beam for the PCell.

Aspect 67: The method of any of Aspects 60-66, wherein the message indicates the SCell that is to be activated as the temporary PCell.

Aspect 68: The method of any of Aspects 60-66, further comprising: transmitting, to the UE, an indication of the SCell that is to be activated as the temporary PCell.

Aspect 69: An apparatus for wireless communication at a device, comprising a processor; memory coupled with the processor; and instructions stored in the memory and executable by the processor to cause the apparatus to perform the method of one or more of Aspects 1-13.

Aspect 70: A device for wireless communication, comprising a memory and one or more processors coupled to the memory, the one or more processors configured to perform the method of one or more of Aspects 1-13.

Aspect 71: An apparatus for wireless communication, comprising at least one means for performing the method of one or more of Aspects 1-13.

Aspect 72: A non-transitory computer-readable medium storing code for wireless communication, the code comprising instructions executable by a processor to perform the method of one or more of Aspects 1-13.

Aspect 73: A non-transitory computer-readable medium storing a set of instructions for wireless communication, the set of instructions comprising one or more instructions that, when executed by one or more processors of a device, cause the device to perform the method of one or more of Aspects 1-13.

Aspect 74: An apparatus for wireless communication at a device, comprising a processor; memory coupled with the processor; and instructions stored in the memory and executable by the processor to cause the apparatus to perform the method of one or more of Aspects 14-26.

Aspect 75: A device for wireless communication, comprising a memory and one or more processors coupled to the memory, the one or more processors configured to perform the method of one or more of Aspects 14-26.

Aspect 76: An apparatus for wireless communication, comprising at least one means for performing the method of one or more of Aspects 14-26.

Aspect 77: A non-transitory computer-readable medium storing code for wireless communication, the code comprising instructions executable by a processor to perform the method of one or more of Aspects 14-26.

Aspect 78: A non-transitory computer-readable medium storing a set of instructions for wireless communication, the set of instructions comprising one or more instructions that, when executed by one or more processors of a device, cause the device to perform the method of one or more of Aspects 14-26.

Aspect 79: An apparatus for wireless communication at a device, comprising a processor; memory coupled with the processor; and instructions stored in the memory and executable by the processor to cause the apparatus to perform the method of one or more of Aspects 27-37.

Aspect 80: A device for wireless communication, comprising a memory and one or more processors coupled to the memory, the one or more processors configured to perform the method of one or more of Aspects 27-37.

Aspect 81: An apparatus for wireless communication, comprising at least one means for performing the method of one or more of Aspects 27-37.

Aspect 82: A non-transitory computer-readable medium storing code for wireless communication, the code comprising instructions executable by a processor to perform the method of one or more of Aspects 27-37.

Aspect 83: A non-transitory computer-readable medium storing a set of instructions for wireless communication, the set of instructions comprising one or more instructions that, when executed by one or more processors of a device, cause the device to perform the method of one or more of Aspects 27-37.

Aspect 84: An apparatus for wireless communication at a device, comprising a processor; memory coupled with the processor; and instructions stored in the memory and executable by the processor to cause the apparatus to perform the method of one or more of Aspects 38-47.

Aspect 85: A device for wireless communication, comprising a memory and one or more processors coupled to the memory, the one or more processors configured to perform the method of one or more of Aspects 38-47.

Aspect 86: An apparatus for wireless communication, comprising at least one means for performing the method of one or more of Aspects 38-47.

Aspect 87: A non-transitory computer-readable medium storing code for wireless communication, the code comprising instructions executable by a processor to perform the method of one or more of Aspects 38-47.

Aspect 88: A non-transitory computer-readable medium storing a set of instructions for wireless communication, the set of instructions comprising one or more instructions that, when executed by one or more processors of a device, cause the device to perform the method of one or more of Aspects 38-47.

Aspect 89: An apparatus for wireless communication at a device, comprising a processor; memory coupled with the processor; and instructions stored in the memory and executable by the processor to cause the apparatus to perform the method of Aspect 48.

Aspect 90: A device for wireless communication, comprising a memory and one or more processors coupled to the memory, the one or more processors configured to perform the method of Aspect 48.

Aspect 91: An apparatus for wireless communication, comprising at least one means for performing the method of Aspect 48.

Aspect 92: A non-transitory computer-readable medium storing code for wireless communication, the code comprising instructions executable by a processor to perform the method of Aspect 48.

Aspect 93: A non-transitory computer-readable medium storing a set of instructions for wireless communication, the set of instructions comprising one or more instructions that, when executed by one or more processors of a device, cause the device to perform the method of Aspect 48.

Aspect 94: An apparatus for wireless communication at a device, comprising a processor; memory coupled with the processor; and instructions stored in the memory and executable by the processor to cause the apparatus to perform the method of Aspect 49.

Aspect 95: A device for wireless communication, comprising a memory and one or more processors coupled to the memory, the one or more processors configured to perform the method of Aspect 49.

Aspect 96: An apparatus for wireless communication, comprising at least one means for performing the method of Aspect 49.

Aspect 97: A non-transitory computer-readable medium storing code for wireless communication, the code comprising instructions executable by a processor to perform the method of Aspect 49.

Aspect 98: A non-transitory computer-readable medium storing a set of instructions for wireless communication, the set of instructions comprising one or more instructions that, when executed by one or more processors of a device, cause the device to perform the method of Aspect 49.

Aspect 99: An apparatus for wireless communication at a device, comprising a processor; memory coupled with the processor; and instructions stored in the memory and executable by the processor to cause the apparatus to perform the method of one or more of Aspects 50-59.

Aspect 100: A device for wireless communication, comprising a memory and one or more processors coupled to the memory, the one or more processors configured to perform the method of one or more of Aspects 50-59.

Aspect 101: An apparatus for wireless communication, comprising at least one means for performing the method of one or more of Aspects 50-59.

Aspect 102: A non-transitory computer-readable medium storing code for wireless communication, the code comprising instructions executable by a processor to perform the method of one or more of Aspects 50-59.

Aspect 103: A non-transitory computer-readable medium storing a set of instructions for wireless communication, the set of instructions comprising one or more instructions that, when executed by one or more processors of a device, cause the device to perform the method of one or more of Aspects 50-59.

Aspect 104: An apparatus for wireless communication at a device, comprising a processor; memory coupled with the processor; and instructions stored in the memory and executable by the processor to cause the apparatus to perform the method of one or more of Aspects 60-68.

Aspect 105: A device for wireless communication, comprising a memory and one or more processors coupled to the memory, the one or more processors configured to perform the method of one or more of Aspects 60-68.

Aspect 106: An apparatus for wireless communication, comprising at least one means for performing the method of one or more of Aspects 60-68.

Aspect 107: A non-transitory computer-readable medium storing code for wireless communication, the code comprising instructions executable by a processor to perform the method of one or more of Aspects 60-68.

Aspect 108: A non-transitory computer-readable medium storing a set of instructions for wireless communication, the set of instructions comprising one or more instructions that, when executed by one or more processors of a device, cause the device to perform the method of one or more of Aspects 60-68.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      transmit, to a base station, a request to transmit uplink control information (UCI), for a first physical uplink control channel (PUCCH) group that includes a primary cell (PCell) and for a second PUCCH group that includes a PUCCH secondary cell (SCell), via the PUCCH SCell; and
      receive, from the base station, an indication of whether the request is rejected or approved.

2. The apparatus of claim 1, wherein the one or more processors are further configured to:
   receive, from the base station, a configuration for the first PUCCH group and for the second PUCCH group.

3. The apparatus of claim 1, wherein the one or more processors are further configured to:
   detect a beam failure on the PCell,
      the request being transmitted based at least in part on the beam failure on the PCell.

4. The apparatus of claim 1, wherein the one or more processors are further configured to:
   transmit, to the base station, one or more messages of a random access procedure for the PCell based at least in part on the indication indicating that the request is rejected.

5. The apparatus of claim 1, wherein the one or more processors are further configured to:
   transmit, to the base station, the UCI via the PUCCH SCell based at least in part on the indication indicating that the request is approved.

6. The apparatus of claim 1, wherein the one or more processors are further configured to:
   transmit, to the base station, a beam failure recovery message via the PUCCH SCell or another SCell based at least in part on the indication indicating that the request is approved.

7. The apparatus of claim 6, wherein the beam failure recovery message indicates one or more of:
   a reason for a beam failure on the PCell,
   failed beam information associated with the beam failure on the PCell, or
   preferred beam information.

8. The apparatus of claim 6, wherein the beam failure recovery message is a medium access control control element (MAC-CE).

9. The apparatus of claim 6, wherein the one or more processors are further configured to:
   receive, from the base station and based at least in part on the beam failure recovery message, a message that indicates a new beam for the PCell.

10. The apparatus of claim 9, wherein the message further indicates a new PUCCH group configuration for the first PUCCH group and for the second PUCCH group.

11. The apparatus of claim 6, wherein the one or more processors are further configured to:
   receive, from the base station, a message that indicates activation or deactivation of PCell beam failure recovery using an SCell, the beam failure recovery message being transmitted based at least in part on the message indicating activation of the PCell beam failure recovery using the SCell.

12. The apparatus of claim 1, wherein the one or more processors are further configured to:
transmit, to the base station, a message requesting activation or deactivation of PCell beam failure recovery using an SCell.

13. The apparatus of claim 1, wherein the one or more processors are further configured to:
receive, from the base station, a message that indicates deactivation of the PUCCH SCell; and
transmit, to the base station, one or more messages of a random access procedure for the PCell based at least in part on receiving the message that indicates deactivation of the PUCCH SCell.

14. An apparatus for wireless communication at a base station, comprising:
a memory; and
one or more processors, coupled to the memory, configured to:
receive, from a user equipment (UE), a request to transmit uplink control information (UCI), for a first physical uplink control channel (PUCCH) group that includes a primary cell (PCell) and for a second PUCCH group that includes a PUCCH secondary cell (SCell), via the PUCCH SCell; and
transmit, to the UE, an indication of whether the request is rejected or approved.

15. The apparatus of claim 14, wherein the one or more processors are further configured to:
transmit, to the UE, a configuration for the first PUCCH group and for the second PUCCH group.

16. The apparatus of claim 14, wherein the request is rejected or approved based at least in part on a determination of whether the PUCCH SCell is capable of supporting the UCI.

17. The apparatus of claim 14, wherein the one or more processors are further configured to:
receive, from the UE, one or more messages of a random access procedure for the PCell based at least in part on the indication indicating that the request is rejected.

18. The apparatus of claim 14, wherein the one or more processors are further configured to:
receive, from the UE, the UCI via the PUCCH SCell based at least in part on the indication indicating that the request is approved.

19. The apparatus of claim 14, wherein the one or more processors are further configured to:
receive, from the UE, a beam failure recovery message via the PUCCH SCell or another SCell based at least in part on the indication indicating that the request is approved.

20. The apparatus of claim 19, wherein the beam failure recovery message indicates one or more of:
a reason for a beam failure on the PCell,
failed beam information associated with the beam failure on the PCell, or
preferred beam information.

21. The apparatus of claim 19, wherein the beam failure recovery message is a medium access control control element (MAC-CE).

22. The apparatus of claim 19, wherein the one or more processors are further configured to:
transmit, to the UE and based at least in part on the beam failure recovery message, a message that indicates a new beam for the PCell.

23. The apparatus of claim 22, wherein the message further indicates a new PUCCH group configuration for the first PUCCH group and for the second PUCCH group.

24. The apparatus of claim 19, wherein the one or more processors are further configured to:
transmit, to the UE, a message that indicates activation or deactivation of PCell beam failure recovery using an SCell,
the beam failure recovery message being received based at least in part on the message indicating activation of the PCell beam failure recovery using the SCell.

25. The apparatus of claim 14, wherein the one or more processors are further configured to:
receive, from the UE, a message requesting activation or deactivation of PCell beam failure recovery using an SCell.

26. The apparatus of claim 14, wherein the one or more processors are further configured to:
transmit, to the UE, a message that indicates deactivation of the PUCCH SCell; and
receive, from the UE, one or more messages of a random access procedure for the PCell based at least in part on transmitting the message that indicates deactivation of the PUCCH SCell.

27. An apparatus for wireless communication at an UE, comprising:
a memory; and
one or more processors, coupled to the memory, configured to:
receive, from a base station, an indication to transmit uplink control information (UCI), for a first physical uplink control channel (PUCCH) group that includes a primary cell (PCell) and for a second PUCCH group that includes a PUCCH secondary cell (SCell), via the PUCCH SCell; and
transmit, to the base station, the UCI via the PUCCH SCell based at least in part on the indication.

28. The apparatus of claim 27, wherein the one or more processors are further configured to:
transmit, to the base station, a beam failure recovery message via the PUCCH SCell or another SCell based at least in part on the indication.

29. An apparatus for wireless communication at a base station, comprising:
a memory; and
one or more processors, coupled to the memory, configured to:
transmit, to a user equipment (UE), an indication to transmit uplink control information (UCI), for a first physical uplink control channel (PUCCH) group that includes a primary cell (PCell) and for a second PUCCH group that includes a PUCCH secondary cell (SCell), via the PUCCH SCell; and
receive, from the UE, the UCI via the PUCCH SCell based at least in part on the indication.

30. The apparatus of claim 29, wherein the one or more processors are further configured to:
receive, from the UE, a beam failure recovery message via the PUCCH SCell or another SCell based at least in part on the indication.

* * * * *